United States Patent
Guo et al.

(10) Patent No.: US 11,306,169 B2
(45) Date of Patent: *Apr. 19, 2022

(54) PRESSURE SENSITIVE ADHESIVE COMPOSITIONS AND METHODS FOR PREPARING SAME

(71) Applicant: Synthomer USA LLC, Dover, DE (US)

(72) Inventors: Jong S. Guo, Charlotte, NC (US); Peter L. Shaw, Bishops Stortford (GB)

(73) Assignee: Synthomer USA LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,194

(22) Filed: Aug. 7, 2018

(65) Prior Publication Data

US 2019/0136096 A1 May 9, 2019
US 2020/0224064 A9 Jul. 16, 2020

Related U.S. Application Data

(63) Continuation-in-part of application No. 15/749,864, filed as application No. PCT/EP2016/068633 on Aug. 4, 2016, application No. 16/057,194, which is a continuation-in-part of application No. PCT/EP2017/052367, filed on Feb. 3, 2017.

(60) Provisional application No. 62/201,353, filed on Aug. 5, 2015.

(51) Int. Cl.
| | |
|---|---|
| *C09J 7/38* | (2018.01) |
| *C09J 133/06* | (2006.01) |
| *C08F 220/18* | (2006.01) |
| *C09J 4/00* | (2006.01) |

(52) U.S. Cl.
CPC .......... *C08F 220/1808* (2020.02); *C09J 4/00* (2013.01); *C09J 7/385* (2018.01); *C09J 133/066* (2013.01); *C08F 220/1804* (2020.02); *C08F 220/1811* (2020.02); *C08F 2800/20* (2013.01); *C09J 2301/408* (2020.08); *C09J 2301/414* (2020.08); *C09J 2423/00* (2013.01); *C09J 2433/00* (2013.01)

(58) Field of Classification Search
CPC .. C09J 7/385; C09J 133/066; C09J 2205/102; C09J 2205/114; C09J 2423/00; C09J 2433/00; C08F 220/18; C08F 2800/20
See application file for complete search history.

(56) References Cited

U.S. PATENT DOCUMENTS

| | | | |
|---|---|---|---|
| 5,908,908 A | 6/1999 | Vanhoye et al. | |
| 6,713,552 B1 | 3/2004 | Lesko et al. | |
| 2002/0082319 A1 | 6/2002 | Zhao et al. | |
| 2007/0196455 A1 | 8/2007 | Kamiyama et al. | |
| 2009/0264585 A1 | 10/2009 | Avramidis et al. | |
| 2012/0261070 A1 | 10/2012 | Gerst et al. | |
| 2012/0263950 A1* | 10/2012 | Gerst | C09J 4/00 428/355 EP |
| 2013/0202886 A1 | 8/2013 | Gerst et al. | |
| 2014/0142238 A1* | 5/2014 | Guo | C09J 133/08 524/521 |
| 2016/0122597 A1 | 5/2016 | Xiao et al. | |

FOREIGN PATENT DOCUMENTS

| | | |
|---|---|---|
| EP | 2336254 A1 | 6/2011 |
| WO | 2014187692 A1 | 11/2014 |
| WO | 2017021487 A1 | 2/2017 |

* cited by examiner

*Primary Examiner* — Bijan Ahvazi
(74) *Attorney, Agent, or Firm* — The Webb Law Firm

(57) ABSTRACT

A pressure sensitive adhesive composition is described. The pressure sensitive adhesive composition includes a polymerization product of a monomer mixture. The monomer mixture includes the following components: (a) at least one alkyl ester of (meth)acrylic acid or cyclic hydrocarbon acrylates; (b) at least one vinyl ester of a $C_4$-$C_{20}$ carboxylic acid; (c) at least one hydroxyl functional (meth)acrylate monomer, or at least one epoxy functional (meth)acrylate monomer; (d) at least one ureido substituted ethylenically unsaturated monomer; and one or more optional monomer components (e)-(g). The pressure sensitive adhesive composition provides a desirable combination of low and high temperature performance, and good adhesion to both metal and organic polymer surfaces.

19 Claims, No Drawings

PRESSURE SENSITIVE ADHESIVE COMPOSITIONS AND METHODS FOR PREPARING SAME

CROSS-REFERENCE TO RELATION APPLICATIONS

This application is a continuation-in-part of U. S. patent application Ser. No. 15/749,864 that was filed on Feb. 2, 2018, which claims priority to International Patent Application Number PCT/EP2016/068633 that was filed on Aug. 4, 2016, which claims priority to U.S. Provisional Patent Application No. 62/201,353, which was filed on Aug. 5, 2015, which are incorporated by reference herein. This application is further a continuation-in-part of International Patent Application Number PCT/EP2017/052367 that was filed on Feb. 3, 2017, which is incorporated by reference herein.

FIELD OF THE INVENTION

The present invention relates to pressure sensitive adhesive (PSA) compositions and methods for preparing PSA compositions.

BACKGROUND OF THE INVENTION

Pressure sensitive adhesives are useful in a number of applications, such as bonding a material, such as a flexible material, to a substrate. Applications that pressure sensitive adhesives are used for include, but are not limited to, tapes, labels, and decals. With some applications, such as specialty tapes, comparable or equivalent adhesive properties at both low temperature, such as room temperature, and elevated temperature is typically desirable. More particularly, it is desirable that the pressure sensitive adhesive provide a combination of high adhesive properties, such as high peel resistance, at low temperatures and good shear (or creep) resistance at high temperature. A desirable level of shear/creep resistance at high temperature for a pressure sensitive adhesive can be quantified with regard to a high shear adhesion failure temperature value (also known as a high SAFT value). High shear adhesion failure temperature values can be associated with a high cohesive strength (or internal strength) within the pressure sensitive adhesive layer.

It would be desirable to develop new pressure sensitive adhesive compositions that are capable of providing a combination of low temperature and high temperature performance, such as high adhesive properties at low temperatures coupled with a desirable level of shear/creep resistance at high temperatures. It would be further desirable that such newly developed pressure sensitive adhesive compositions provide good adhesion to both polar surfaces, such as metallic surfaces, and non-polar surfaces, such as organic polymer surfaces, such as high density polyethylene.

SUMMARY OF THE INVENTION

Combining ureido functional (meth)acrylic monomer with a hydroxylalkyl functional monomer gives a polymer unexpected high cohesive strength for an acrylic emulsion adhesive. Typically, acrylic emulsion adhesives do not exhibit high cohesive strength compared to solvent based acrylic adhesives, especially at higher temperatures. Adding a ureido functional monomer to an acrylic polymer improves adhesion, especially to metal substrates, both for coatings and adhesives.

Before the disclosure of this invention, it was not known that combining a ureido functional monomer with a hydroxyalkyl functional monomer would increase cohesion as well as adhesion. The addition of VV10 monomer improves the adhesion to lower energy substrates (e.g. HDPE, PP, etc.) while maintaining the high cohesive strength of the adhesive. It was unexpected to find that VV10, which is a soft hydrophobic monomer, combined with a well protected ester group, creates a ureido/hydroxyl couple that would still dominate the SAFT behavior and that there would still be sufficient adhesion to stainless steel and aluminum. Before the disclosure of this invention, there was no expectation of the technical effect achieved with the materials that have been used in combination, as described herein. Adhesion, as used herein, is the attraction between the dried adhesive and a substrate. The strength of that attraction is measured by the force required to remove the adhesive from the substrate by mechanical means. Cohesion, on the other hand, refers to the ability of the dried adhesive to remain whole or resist being torn apart under an applied force. Adhesive articles with high cohesive strength can be removed cleanly from the substrate without leaving a part of the adhesive behind. Adhesive strength is typically measured by peel testing (force perpendicular to the bonding surface) while cohesive strength is typically measured by shear testing (force parallel to the bonding surface).

In accordance with some embodiments of the present invention, there is provided a pressure sensitive adhesive composition comprising a polymerization product (for example, an emulsion polymerization product or a colloidal polymerization product) of a monomer mixture, in which the monomer mixture comprises the following components: (a) more than 30 wt. % of at least one alkyl ester of (meth) acrylic acid or cyclic hydrocarbon acrylates; (b) 0.1 to less than 25 wt. % of at-least one vinyl ester of $C_4$-$C_{20}$ carboxylic acids; (c) 0.1 to 8 wt. % of at least one hydroxyl functional (meth)acrylate monomer, or 0.1 to 10 wt. % of at least one epoxy functional (meth)acrylate monomer; (d) 0.05 to 3 wt. % of least one ureido substituted ethylenically unsaturated monomer; (e) 0 to 6 wt. % of at least one ethylenically unsaturated carboxylic acid; (f) 0 to 20 wt. % of at least one vinyl aromatic monomer; and (g) 0 to 25 wt. % at least one ethylenically unsaturated monomer different from monomers (a) to (f). Each percent weight (wt. %), in each case, is based on total weight of the monomer mixture.

In accordance with some further embodiments of the present invention, there is provided a process for making the polymerization product of the monomer mixture described above, wherein the monomer mixture is subjected to a polymerization step, wherein during the polymerization step temperature is monitored and a maximum temperature is recorded, wherein the maximum temperature recorded during the monitoring is that of a reaction exotherm peak, and wherein the entire amount of the at least one ureido substituted ethylenically unsaturated monomer (d) is added to components (a)-(c) and (e)-(g) after the maximum temperature is reached. Alternatively, the at least one ureido substituted ethylenically unsaturated monomer (d) can be added to components (a)-(c) and (e)-(g) before the maximum temperature is reached, or at the time that the maximum temperature is reached.

In accordance with some further embodiments of the present invention, there is provided a method for making a polymerization product (for example, an emulsion polymerization product or a colloidal polymerization product). The method comprises reacting the following components: (a) more than 30 wt. % of at least one alkyl ester of (meth) acrylic acid or cyclic hydrocarbon acrylates; (b) 0.1 to less than 25 wt. % of at-least one vinyl ester of $C_4$-$C_{20}$ carboxylic acids; (c) 0.1 to 8 wt. % of at least one hydroxyl functional (meth)acrylate monomer, or 0.1 to 10 wt. % of at least one epoxy functional (meth)acrylate monomer; (d) 0.05 to 3 wt. % of least one ureido substituted ethylenically unsaturated monomer; (e) optionally 0 to 6 wt. % of at least one ethylenically unsaturated carboxylic acid; (f) optionally 0 to 20 wt. % of at least one vinyl aromatic monomer; and (g) optionally 0 to 25 wt. % at least one ethylenically unsaturated monomer different from monomers (a) to (f). Each percent weight (wt. %), in each case, is based on total weight of the monomer mixture.

In accordance with some additional embodiments of the present invention, there is provided a post-processing step performed on a redispersed polymer, dried polymer or polymer latex resulting from the polymerization of the monomer mixture described above. The post-processing step comprises subjecting the polymer to treatment with glycidyl alkyl compounds or diol compounds to at least partially convert structural units (or monomer units) resulting from polymerization of the at least one ethylenically unsaturated carboxylic acid (e) into structural units which can result from (or structural units corresponding to structural units resulting from) polymerization of the at least one hydroxyl functional (meth)acrylate monomer (c).

In accordance with some additional embodiments of the present invention, there is provided a method of post-processing a polymer. The polymer is provided. The polymer may be a redispersed polymer, a dried polymer or a polymer latex. The polymer comprising a polymerization product (for example, an emulsion polymerization product or a colloidal polymerization product) of a monomer mixture, in which the monomer mixture comprises the following components: (a) one or more alkyl ester of (meth)acrylic acid or cyclic hydrocarbon acrylate, wherein the one or more alkyl ester of (meth) acrylic acid or cyclic hydrocarbon acrylates comprises at least one low Tg monomer that produces a homopolymer having a glass transition temperature ("Tg") of less than −20° C., and wherein the sum of all of the one or more of the alkyl ester of (meth) acrylic acid or cyclic hydrocarbon is more than 30 wt. %; (b) 0.1 to less than 25 wt. % of at-least one vinyl ester of $C_4$-$C_{20}$ carboxylic acids; (c) 0.1 to 8 wt. % of at least one hydroxyl functional (meth)acrylate monomer, or 0.1 to 10 wt. % of at least one epoxy functional (meth)acrylate monomer; (d) 0.05 to 3 wt. % of least one ureido substituted ethylenically unsaturated monomer; (e) optionally 0 to 6 wt. % of at least one ethylenically unsaturated carboxylic acid; (f) optionally 0 to 20 wt. % of at least one vinyl aromatic monomer; and (g) optionally 0 to 25 wt. % at least one ethylenically unsaturated monomer different from monomers (a) to (f). Each percent weight (wt. %), in each case, is based on total weight of the monomer mixture. The method comprises treating the polymer with glycidyl alkyl compounds or diol compounds. The post-treatment of the polymer at least partially converts structural units (or monomer units) resulting from polymerization of the at least one ethylenically unsaturated carboxylic acid (e) into structural units which can result from (or structural units corresponding to structural units resulting from) polymerization of the at least one hydroxyl functional (meth)acrylate monomer (c).

In accordance with some further additional embodiments of the present invention there is provided an article including the pressure sensitive adhesive composition described above, wherein the pressure sensitive adhesive composition is freely (or directly) applied to the article or is applied as an adhesive tape containing a first surface, and wherein the article is an automotive; marine vessel; electronic component; furnace; pyrolysis unit; exhaust gas equipment; subterranean piping (or conduit); subterranean construction enabling the conveyance of crude oil/gas; industrial hot utility equipment; reactor vessel containing reactants for performing an exothermic reaction or an endothermic reaction; rotating machinery such as centrifuges, space equipment, geothermal apparatus, or medical implants; or any other suitable article.

The invention also includes a method of making a polymerization product (for example, an emulsion polymerization product or a colloidal polymerization product). The method includes reacting a monomer mixture. The monomer mixture includes the following components: one or more alkyl ester of (meth)acrylic acid or cyclic hydrocarbon acrylate, wherein the one or more alkyl ester of (meth) acrylic acid or cyclic hydrocarbon acrylates comprises at least one low Tg monomer that produces a homopolymer having a Tg of less than −20° C., and wherein the sum of all of the one or more alkyl ester of (meth) acrylic acid or cyclic hydrocarbon is more than 30 wt. %; (b) 0.1 to less than 25 wt. % of at-least one vinyl ester of $C_4$-$C_{20}$ carboxylic acids; (c) 0.1 to 8 wt. % of at least one hydroxyl functional (meth)acrylate monomer, or 0.1 to 10 wt. % of at least one epoxy functional (meth)acrylate monomer; (d) 0.05 to 3 wt. % of least one ureido substituted ethylenically unsaturated monomer; (e) 0 to 6 wt. % of at least one ethylenically unsaturated carboxylic acid; (f) 0 to 20 wt. % of at least one vinyl aromatic monomer; and (g) 0 to 25 wt. % at least one ethylenically unsaturated monomer different from monomers (a) to (f). Each percent weight (wt. %), in each case, is based on total weight of the monomer mixture.

The invention also includes an article made by a process. The process includes reacting a monomer mixture. The monomer mixture includes the following: one or more alkyl ester of (meth)acrylic acid or cyclic hydrocarbon acrylate, wherein the one or more alkyl ester of (meth) acrylic acid or cyclic hydrocarbon acrylates comprises at least one low Tg monomer that produces a homopolymer having a Tg of less than −20° C., and wherein the sum of all of the one or more alkyl ester of (meth) acrylic acid or cyclic hydrocarbon is more than 30 wt. %; (b) 0.1 to less than 25 wt. % of at-least one vinyl ester of $C_4$-$C_{20}$ carboxylic acids; (c) 0.1 to 8 wt. % of at least one hydroxyl functional (meth)acrylate monomer, or 0.1 to 10 wt. % of at least one epoxy functional (meth)acrylate monomer; (d) 0.05 to 3 wt. % of least one ureido substituted ethylenically unsaturated monomer; (e) 0 to 6 wt. % of at least one ethylenically unsaturated carboxylic acid; (f) 0 to 20 wt. % of at least one vinyl aromatic monomer; and (g) 0 to 25 wt. % at least one ethylenically unsaturated monomer different from monomers (a) to (f). Each percent weight (wt. %), in each case, is based on total weight of the monomer mixture.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described. Further, where the disclosure refers to individual embodiments of the invention, the invention is to be considered to include combinations of said embodiments as well.

DETAILED DESCRIPTION OF THE INVENTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester," means methacrylates and/or acrylates, in general, with or without substitutions. As used herein, the term "(meth)acrylic acid" means methacrylic acid and/or acrylic acid, in general.

All documents, such as but not limited to issued patents and patent applications, referred to herein, and unless otherwise indicated, are to be considered to be "incorporated by reference" in their entirety.

The monomer mixture, from which the polymerization product of the present invention is prepared, includes (a) more than 30 wt. % of, at least one alkyl ester of (meth) acrylic acid (or alkyl (meth)acrylate) or at least one cyclic hydrocarbon (meth)acrylate, or combinations of at least one alkyl ester of (meth)acrylic acid and at least one cyclic hydrocarbon (meth)acrylate.

With some embodiments, each alkyl ester of (meth) acrylic acid of component (a) is independently a $C_1$-$C_{18}$ alkyl (meth)acrylate.

Examples of alkyl (meth)acrylate monomers from which the alkyl ester of (meth)acrylic acid of component (a) can be selected include, but are not limited to, methyl (meth) acrylate, ethyl (meth)acrylate, n-propyl (meth)acrylate, iso-propyl (meth)acrylate, n-butyl (meth)acrylate, secondary-butyl (meth)acrylate, tert-butyl (meth)acrylate, hexyl (meth) acrylate, 2-ethyl-hexyl (meth)acrylate, isooctyl (meth) acrylate, 4-methyl-2-pentyl (meth)acrylate, decyl (meth) acrylate, dodecyl (meth)acrylate, n-lauryl (meth)acrylate, octadecyl (meth)acrylate, 2-methylbutyl (meth)acrylate, stearyl (meth)acrylate, and 2-phenylethyl (meth)acrylate.

With some embodiments of the present invention, the alkyl group of the alkyl (meth)acrylate can be substituted with an amine group, which can be a primary, secondary, or tertiary amine group. Examples of alkyl (meth)acrylate monomers, in which the alkyl group is substituted with an amine group include, but are not limited to, 1-(di-n-butylamino)ethyl (meth)acrylate, 1-(di-tert-butylamino)ethyl (meth)acrylate, 1-(di-n-propylamino)ethyl (meth)acrylate, 1-(di-isopropylamino)ethyl (meth)acrylate, 1-(diethylamino)ethyl (meth)acrylate, and 1-(dimethylamino)ethyl (meth)acrylate.

The cyclic hydrocarbon, of the cyclic hydrocarbon (meth) acrylate monomers from which component (a) can be selected, can be: an aliphatic cyclic hydrocarbon, including single ring and/or fused ring aliphatic cyclic hydrocarbons; or an aromatic cyclic hydrocarbon, including single ring and fused ring aromatic cyclic hydrocarbons. Examples of cyclic hydrocarbon (meth)acrylate monomers from which component (a) can be selected include, but are not limited to, cyclohexyl (meth)acrylate, decahydronaphthalenyl (meth) acrylate, isobornyl (meth)acrylate, benzyl (meth)acrylate, phenyl (meth)acrylate, naphthalenyl (meth)acrylate, anthracenyl (meth)acrylate, and combinations thereof.

In accordance with some embodiments of the present invention, the cyclic hydrocarbon (meth)acrylate of component (a) includes isobornyl (meth)acrylate.

The alkyl (meth)acrylate and/or cyclic hydrocarbon (meth)acrylate monomers of component (a) are present in an amount of more than 30 wt. %, based on total weight of the monomer mixture. With some embodiments, the (meth) acrylate and/or cyclic hydrocarbon (meth)acrylate monomers of component (a) are present in an amount of at least 38 wt. %, or at least 40 wt. %, or at least 50 wt. %, or at least 60 wt. %, or at least 70 wt. %, where each wt. % in each case is based on total weight of the monomer mixture. With some further embodiments, the (meth)acrylate and/or cyclic hydrocarbon (meth)acrylate monomers of component (a) are present in an amount of less than or equal to 99 wt. %, or less than or equal to 97 wt. %, or less than or equal to 95 wt. %, or less than or equal to 91 wt. %, where each wt. % in each case is based on total weight of the monomer mixture. The amount of alkyl (meth)acrylate and/or cyclic hydrocarbon (meth)acrylate monomers of component (a) can range between any combination of these lower and upper threshold values, such as: from more than 30 wt. % to less than or equal to 99 wt. %; or from at least 40 wt. % to less than or equal to 99 wt. %; or from at least 55 wt. % to less than or equal to 95 wt. %; or from at least 70 wt. % to less than or equal to 92 wt. %; where each wt. % in each case is based on total weight of the monomer mixture. For example, the total amount of component (a) for all of the alkyl (meth) acrylate and/or cycle hydrocarbon (meth)acrylate monomer of component (a) for example, the total amount of component (a) for all of the alkyl esters of (meth)acrylic acid present can be between 40 wt. % to 99 wt. %; preferably between 50 wt. % to 95 wt. %; most preferably between 70 wt. % to 92 wt. %.

In accordance with some embodiments of the present invention, component (a) of the monomer mixture includes: (i) a first alkyl ester of (meth)acrylic acid of more than 30 wt. %; and (ii) a second alkyl ester of (meth)acrylic acid of more than 12 wt. %. The (i) first and (ii) second alkyl ester of (meth)acrylic acid monomers are in each case a different alkyl ester of (meth)acrylic acid monomer, and correspondingly are different from each other. The total amount of component (a) or all of the alkyl esters of (meth)acrylic acid present can be less than or equal to 99 wt. %, less than or equal to 97 wt. %, less than or equal to 95 wt. %, or less than or equal to 92 wt. %. The total amount of component (a) for all of the alkyl esters of (meth)acrylic acid present can be at least 30 wt. %, at least 40 wt. %, at least 50 wt. %, at least 60 wt. % or at least 70 wt. %. The total amount of component (a) or all of alkyl esters of (meth)acrylic acid present can be in a range between any combination of these lower and upper threshold values, such as: from more than 30 wt. % to less than or equal to 99 wt. %; more than 40 wt. % to less than or equal to 99 wt. %, more than 55 wt. % to less than or equal to 95 wt. %, more than 70 wt. % to less than or equal to 92 wt. %, or more than 55 wt. % to less than or equal to 85 wt. %. For example, the total amount of component (a) for all of the alkyl esters of (meth)acrylic acid present can be between 40 wt. % to 99 wt. %; preferably between 50 wt. % to 95 wt. %; most preferably between 70 wt. % to 92 wt. %.

The first alkyl ester of (meth)acrylic acid may be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, or isobutyl acrylate.

The second alkyl ester of (meth) acrylic acid may be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, isobutyl acrylate, ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, iso-butyl methacrylate, sec-butyl methacrylate, ethyl methacrylate, isopropyl methacrylate, isobonyl acrylate, methyl methacrylate, isobornyl methacrylate, phenyl methacrylate, t-butyl methacrylate or cyclohexyl methacrylate.

In accordance with some embodiments of the present invention, component (a) includes a mixture of at least, a first monomer of component (a) and a second monomer of component (a), in which: the first monomer produces a homopolymer having a Tg of less than −20° C., preferably less than −40° C.; and the second monomer produces a homopolymer having a Tg of less than −20° C., greater than 50° C., or greater than or equal to −20° C. and less than or equal to 50° C.

With some embodiments in which component (a) of the monomer mixture includes: (i) a first alkyl ester of (meth) acrylic acid of more than 30 wt. %; and (ii) a second alkyl ester of (meth)acrylic acid of more than 12 wt. %, the (i) first alkyl ester of (meth)acrylic acid and the (ii) second alkyl ester of (meth)acrylic acid, each independently produce a homopolymer having a glass transition temperature (Tg) of less than −20° C., as measured by differential scanning calorimetry (DSC), in accordance with American Society for Testing and Materials (ASTM) D3418-03. The total amount of component (a) or all of the alkyl esters of (meth)acrylic acid present can be less than or equal to 99 wt. %, less than or equal to 97 wt. %, less than or equal to 95 wt. %, or less than or equal to 92 wt. %. The total amount of component (a) for all of the alkyl esters of (meth)acrylic acid present can be at least 30 wt. %, at least 40 wt. %, at least 50 wt. %, at least 60 wt. % or at least 70 wt. %. The total amount of component (a) or all of alkyl esters of (meth)acrylic acid present can be in a range between any combination of these lower and upper threshold values, such as: from more than 30 wt. % to less than or equal to 99 wt. %; more than 40 wt. % to less than or equal to 99 wt. %, more than 55 wt. % to less than or equal to 95 wt. %, more than 70 wt. % to less than or equal to 92 wt. %, or more than 55 wt. % to less than or equal to 85 wt. %. For example, the total amount of component (a) for all of the alkyl esters of (meth)acrylic acid present can be between 40 wt. % to 99 wt. %; preferably between 50 wt. % to 95 wt. %; most preferably between 70 wt. % to 92 wt. %.

In accordance with some further embodiments of the present invention, component (a) of the monomer mixture includes: (i) a first alkyl ester of (meth)acrylic acid of more than 30 wt. %; (ii) a second alkyl ester of (meth)acrylic acid of more than 12 wt. %; and (iii) a third alkyl ester of (meth)acrylic acid between 0.5 to 30 wt. %, where each wt. % in each case is based on total weight of the monomer mixture. The (i) first, (ii) second, and (iii) third alkyl ester of (meth)acrylic acid monomers are in each case a different alkyl ester of (meth)acrylic acid monomer, and correspondingly are different from each other. The total amount of component (a) or all of the alkyl esters of (meth)acrylic acid present can be less than or equal to 99 wt. %, less than or equal to 97 wt. %, less than or equal to 95 wt. %, or less than or equal to 92 wt. %. The total amount of component (a) for all of the alkyl esters of (meth)acrylic acid present can be at least 30 wt. %, at least 40 wt. %, at least 50 wt. %, at least 60 wt. % or at least 70 wt. %. The total amount of component (a) or all of alkyl esters of (meth)acrylic acid present can be in a range between any combination of these lower and upper threshold values, such as: from more than 30 wt. % to less than or equal to 99 wt. %; more than 40 wt. % to less than or equal to 99 wt. %, more than 55 wt. % to less than or equal to 95 wt. %, more than 70 wt. % to less than or equal to 92 wt. %, or more than 55 wt. % to less than or equal to 85 wt. %. For example, the total amount of component (a) for all of the alkyl esters of (meth)acrylic acid present can be between 40 wt. % to 99 wt. %; preferably between 50 wt. % to 95 wt. %; most preferably between 70 wt. % to 92 wt. %.

Component (a) of the monomer mixture, with some embodiments of the present invention, includes: (i) a first alkyl ester of (meth)acrylic acid of more than 30 wt, %; (ii) a second alkyl ester of (meth)acrylic acid of more than 12 wt. %; (iii) a third alkyl ester of (meth)acrylic acid of between 0.5 to 30 wt. %; and (iv) a fourth alkyl ester of (meth)acrylic acid of less than 12 wt. %, where each wt. % in each case is based on total weight of the monomer mixture. The (i) first, (ii) second, (iii) third, and (iv) fourth alkyl ester of (meth)acrylic acid monomers are in each case a different alkyl ester of (meth)acrylic acid monomer, and correspondingly are different from each other. The total amount of component (a) or all of the alkyl esters of (meth)acrylic acid present can be less than or equal to 99 wt. %, less than or equal to 97 wt. %, less than or equal to 95 wt. %, or less than or equal to 92 wt. %. The total amount of component (a) for all of the alkyl esters of (meth)acrylic acid present can be at least 30 wt. %, at least 40 wt. %, at least 50 wt. %, at least 60 wt. % or at least 70 wt. %. The total amount of component (a) or all of alkyl esters of (meth)acrylic acid present can be in a range between any combination of these lower and upper threshold values, such as: from more than 30 wt. % to less than or equal to 99 wt. %; more than 40 wt. % to less than or equal to 99 wt. %, more than 55 wt. % to less than or equal to 95 wt. %, more than 70 wt. % to less than or equal to 92 wt. %, or more than 55 wt. % to less than or equal to 85 wt. %. For example, the total amount of component (a) for all of the alkyl esters of (meth)acrylic acid present can be between 40 wt. % to 99 wt. %; preferably between 50 wt. % to 95 wt. %; most preferably between 70 wt. % to 92 wt. %.

In accordance with some embodiments of the present invention, component (a) includes a mixture of at least, a first alkyl ester of (meth)acrylic acid, a second alkyl ester of (meth)acrylic acid, a third alkyl ester of (meth)acrylic acid, and a fourth alkyl ester of (meth)acrylic acid. The first alkyl ester of (meth)acrylic acid produces a homopolymer having a Tg of less than −20° C., preferably less than −40° C. The second alkyl ester of (meth)acrylic acid produces a homopolymer having a Tg of less than −20° C., greater than 50° C., or greater than or equal to −20° C. and less than or equal to 50° C. The third alkyl ester of (meth)acrylic acid produces a homopolymer having a Tg of less than −20° C., greater than 50° C., or greater than or equal to −20° C. and less than or equal to 50° C. The fourth alkyl ester of (meth)acrylic acid produces a homopolymer having a Tg of less than −20° C., greater than 50° C., or greater than or equal to −20° C. and less than or equal to 50° C.

For example, the first alkyl ester of (meth)acrylic acid can be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, or isobutyl acrylate. The second alkyl ester of (meth)acrylic acid can be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, isobutyl acrylate, ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, iso-butyl methacrylate, sec-butyl methacrylate, ethyl methacrylate, isopropyl methacrylate, isobonyl acrylate, methyl methacrylate, isobornyl methacrylate, phenyl methacrylate, t-butyl methacrylate or cyclohexyl methacrylate. The third alkyl ester of (meth)acrylic acid can be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, isobutyl acrylate, ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, isobutyl methacrylate, sec-butyl methacrylate, ethyl methacrylate, isopropyl methacrylate, isobonyl acrylate, methyl methacrylate, isobornyl methacrylate, phenyl methacrylate, t-butyl methacrylate or cyclohexyl methacrylate. The fourth alkyl ester of (meth)acrylic acid can be 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, isobutyl acrylate, ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, isobutyl methacrylate, sec-butyl methacrylate, ethyl methacrylate, isopropyl methacrylate, isobonyl acrylate, methyl methacrylate, isobornyl methacrylate, phenyl methacrylate, t-butyl methacrylate or cyclohexyl methacrylate. The first alkyl ester, the second alkyl ester, the third alkyl ester and the fourth alkyl ester are each different alkyl esters.

With some further embodiments of the present invention, the (i) first, (ii) second, (iii) third, and (iv) fourth alkyl ester (meth)acrylic acid monomers of component (a), are present in an amount (or total amount) of between 30% by weight to 99% by weight, or 50% by weight to 95% by weight, or 70% by weight to 92% by weight, the percent weight in each case being based on total weight of monomers/components (a) to (g) (or based on total weight of the monomer mixture).

With some embodiments, when component (a) of the monomer mixture includes (i) first, (ii) second, (iii) third, and (iv) fourth alkyl ester of (meth)acrylic acid monomers: the (i) first alkyl ester of (meth)acrylic acid and (ii) second alkyl ester of (meth)acrylic acid, each independently produce a homopolymer having Tg from −20° C. to 50° C. or greater than 50° C., as determined in accordance with ASTM D3418-03; the (iii) third alkyl ester of (meth)acrylic acid produces a homopolymer having a Tg less than −20° C., as determined in accordance with ASTM D3418-03; the at least one vinyl aromatic monomer of component (f) is present in an amount of from 1.5 wt. % to 15 wt. %; the (iii) third alkyl ester of (meth)acrylic acid and the at least one vinyl aromatic monomer of component (f), are each independently a hard monomer, and are present in an combined/total amount of less than 20% by weight; and the (i) first alkyl ester of (meth)acrylic acid, (ii) second, and (iv) fourth alkyl ester of (meth)acrylic acid, are present in a combined/total amount of between 70 to 92% wt. Where each wt. % in each case is based on total weight of the monomer mixture. As used herein, the term "hard monomer" means a monomer that produces a homopolymer having a Tg of greater than 50° C., as determined in accordance with ASTM D3418-03.

Alternatively, component (a) of the monomer mixture includes one or more alkyl ester of (meth)acrylic acid or cyclic hydrocarbon acrylate, wherein the one or more alkyl ester of (meth) acrylic acid or cyclic hydrocarbon acrylates comprises at least one low Tg monomer that produces a homopolymer having a Tg of less than −20° C., (preferably less than −40° C.). The low Tg monomer is selected from the group consisting of 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, and isobutyl acrylate.

The one or more alkyl ester of (meth)acrylic acid or cyclic hydrocarbon acrylate can also include a medium Tg monomer that produces a homopolymer having a Tg of greater than or equal to −20° C. and less than or equal to 50° C. and/or a high Tg monomer that produces a homopolymer having a Tg of greater than 50° C. The medium Tg monomer is selected from the group consisting of ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, isobutyl methacrylate. The high Tg monomer is selected from the group consisting of sec-butyl methacrylate, ethyl methacrylate, isopropyl methacrylate, isobonyl acrylate, methyl methacrylate, isobornyl methacrylate, phenyl methacrylate, t-butyl methacrylate and cyclohexyl methacrylate.

The one or more alkyl ester of (meth)acrylic acid or cyclic hydrocarbon acrylate can also include a second low Tg monomer.

For example, the one or more alkyl ester of (meth)acrylic acid or cyclic hydrocarbon acrylate can include a first low Tg monomer and a second low Tg monomer. Alternatively, it can include a first low Tg monomer and a medium Tg monomer. Alternatively, it can include a first low Tg monomer, a second low Tg monomer and a medium Tg monomer. Alternatively, it can include a first low Tg monomer and a high Tg monomer. Alternatively, it can include a first low Tg monomer, a second low Tg monomer and a high Tg monomer. Alternatively, it can include a low Tg monomer, a medium Tg monomer and a high Tg monomer. Alternatively, it can include a first low Tg monomer, a second low Tg monomer, a medium Tg monomer and a high Tg monomer.

The sum of all of the one or more alkyl ester of (meth) acrylic acid or cyclic hydrocarbon acrylate has a total weight percentage of at least 30 wt. %, at least 40 wt. %, at least 42 wt. %, at least 45 wt. %, at least 50 wt. % or at least 55 wt. % by weight of monomers (a) to (g). The sum of all of the one or more alkyl ester of (meth)acrylic acid or cyclic hydrocarbon acrylate has a total weight percentage of less than 99 wt. %, less than 97 wt. %, less than 95 wt. %, less than 92 wt. %, by weight of monomers (a) to (g). The sum of the one or more alkyl ester of (meth)acrylic acid or cyclic hydrocarbon acrylate has a total weight percentage of 30% to 99% by weight of monomers (a) to (g); preferably 80% to 95% by weight of monomers (a) to (g); most preferably at least 70% to 92% by weight of monomers (a) to (g).

The monomer mixture, from which the polymerization product of the present invention is prepared, includes (b) 0.1 wt. % to less than 25 wt. % of at least one vinyl ester of $C_4$-$C_{20}$ carboxylic acid.

With some embodiments, the at least one vinyl ester of $C_4$-$C_{20}$ carboxylic acid of component (b) includes a vinyl ester of a $C_8$-$C_{12}$ carboxylic acid.

With some further embodiments, the vinyl ester of a $C_8$-$C_{12}$ carboxylic acid, of component (b), is a vinyl ester of a branched $C_5$-$C_{10}$ carboxylic acid.

The vinyl ester of a branched $C_5$-$C_{10}$ carboxylic acid of component (b), with some embodiments, contains a quaternary carbon.

The quaternary carbon, of the vinyl ester of the branched $C_8$-$C_{10}$ carboxylic acid that contains a quaternary carbon, of component (b), is bonded to an isobutane group (or isobutyl group), a methyl group, a propane group (or a propyl group), and a carboxylic acid ester group (the carbonyl carbon of a carboxylic acid ester group).

Examples of vinyl ester of $C_4$-$C_{20}$ carboxylic acid monomers of component (b) include, but are not limited to, vinyl-2-ethylhexanoate, vinyl stearate, and one or more vinyl esters of carboxylic acid represented by the following Formula (I),

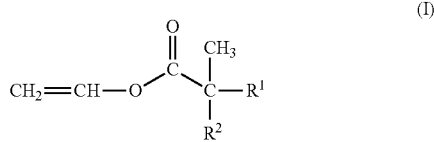

With reference to Formula (I), $R^1$ and $R^2$ are each independently a linear or branched alkyl group that together contain a total of at least 3 carbon atoms, at least 5, at least 6 carbon atoms or at least 7 carbon atoms; and at most 20 carbon atoms, at most 12 carbon atoms or at most 10 carbon atoms, with some embodiments. For example, $R^1$ and $R^2$ can have a total of 5, 6, 7 or 8 carbon atoms, preferably 6 or 7 carbon atoms, most preferably 7 carbon atoms. For example, R1 and R2 can have 3-20 carbon atoms, preferably 5-12 carbon atoms, most preferably 6-10 carbon atoms. With some further embodiments and with further reference to Formula (I), R1 and R2 can be an alkyl group that contains 7 carbon atoms. For example, $R^1$ can be an isobutyl group and $R^2$ can be a propyl group (such as n-propyl or isopropyl). Vinyl esters of carboxylic acids represented by Formula (I), with some embodiments, include a mixture of two or more such vinyl esters of carboxylic acids.

With further reference to Formula (I), when $R^1$ and $R^2$ are each independently a linear or branched alkyl group that together contain a total of 6 carbon atoms, the vinyl ester can be referred to as a vinyl ester of a C9 branched carboxylic acid, examples of which are commercially available under the tradename VEOVA 9 monomer from Momentive Specialty Chemicals Inc. With additional reference to Formula (I), when $R^1$ and $R^2$ are each independently a linear or branched alkyl group that together contain a total of 7 carbon atoms, the vinyl ester can be referred to as a vinyl ester of a C10 branched carboxylic acid, examples of which are commercially available under the tradename VEOVA 10 monomer from Momentive Specialty Chemicals Inc.

The at least one vinyl ester of $C_4$-$C_{20}$ carboxylic acid (b) is present in an amount of 0.1 wt. % to less than 25 wt. % based on total weight of the monomer mixture. With some embodiments, the at least one vinyl ester of $C_4$-$C_{20}$ carboxylic acid (b) is present in an amount of more than 0 wt. %, at least 1 wt. %, or at least 2 wt. %, or at least 6 wt. %, or at least 9 wt. %. With some further embodiments, the at least one vinyl ester of $C_4$-$C_{20}$ carboxylic acid (b) is present in an amount of less than or equal to 25 wt. %, or less than or equal to 22 wt. %, or less than or equal to 20 wt. %, or less than or equal to 17 wt. %, or less than or equal to 15 wt. %, or less than or equal to 12 wt. %, or less than or equal to 10 wt. %. The amount of at least one vinyl ester of $C_4$-$C_{20}$ carboxylic acid (b) can range between any combination of these lower and upper threshold values, such as: from at least 0.1 wt. % to less than or equal to 25 wt. %; or from at least 1 wt. % to less than or equal to 20 wt. %; or from at least 6 wt. % to less than or equal to 17 wt. %; or from at least 2 wt. % to less than or equal to 10 wt. %, where each wt. % in each case is based on total weight of the monomer mixture. For example, the amount of the at least one vinyl ester of $C_4$-$C_{20}$ carboxylic acid (b) can range between at least 0.1 wt. % to less than or equal to 25 wt. %; preferably from at least 1 wt. % to less than or equal to 20 wt. %; most preferably from at least 2 wt. % to less than or equal to 10 wt. %.

The monomer mixture, from which the polymerization product of the present invention is prepared, includes (c) 0.1 wt. % to 8 wt. % of at least one hydroxyl functional (meth)acrylate monomer, and/or 0.1 wt. % to 10 wt. % of at least one epoxy functional (meth)acrylate monomer.

In accordance with some embodiments, component (c) comprises the at least one hydroxyl functional (meth)acrylate monomer, and the at least one hydroxyl functional (meth)acrylate monomer is a $C_1$-$C_{17}$ hydroxy alkyl (meth)acrylate. The alkyl group of the $C_1$-$C_{17}$ hydroxy alkyl moiety (of the $C_1$-$C_{17}$ hydroxy alkyl (meth)acrylate) can be linear or branched. The hydroxyl functional (meth)acrylate monomer, with some embodiments, can be an ester formed from a reaction between (meth)acrylic acid and a glycidyl ester of a $C_2$-$C_{12}$ carboxylic acid.

The at least one hydroxyl functional (meth)acrylate monomer of component (c) is, with some embodiments, selected from hydroxyethyl (meth)acrylate, hydroxypropyl (meth)acrylate, hydroxybutyl(meth)acrylate, hydroxylhexyl (meth)acrylate, hydroxyethylhexyl (meth)acrylate, and combinations thereof. With some further embodiments, the at least one hydroxyl functional (meth)acrylate monomer of component (c) is selected from the at least one hydroxyl functional (meth)acrylate monomer (c) is selected from hydroxyethyl acrylate, hydroxyethyl methacrylate, hydroxypropyl acrylate, hydroxypropyl methacrylate, hydroxybutylacrylate, hydroxybutyl methacrylate, hydroxyhexyl acrylate, hydroxylhexyl methacrylate, hydroxyethylhexyl acrylate, hydroxyethylhexyl methacrylate, and combinations thereof.

Component (c), with some further embodiments, comprises the at least one epoxy functional (meth)acrylate monomer, and the at least one epoxy functional (meth)acrylate monomer is selected from glycidyl (meth)acrylate, $C_1$-$C_{17}$ hydroxyalkyl (meth)acrylate glycidyl ether, and combinations thereof.

At least a portion of the epoxy functional (meth)acrylate monomer of component (c), with some embodiments, is converted to a hydroxyl functional (meth)acrylate monomer: before polymerization; and/or during polymerization; and/or one or more monomer units of the epoxy functional (meth) acrylate monomer of component (c) is converted to a hydroxyl functional (meth)acrylate monomer unit after completion of the polymerization. The epoxy functional (meth)acrylate monomer can be converted to a hydroxyl functional (meth)acrylate monomer, and the epoxy functional (meth)acrylate monomer unit can be converted to a hydroxyl functional (meth)acrylate monomer unit, in each case in accordance with art-recognized methods. For purposes of non-limiting illustration, an epoxy functional (meth)acrylate monomer, such as glycidyl (meth)acrylate, can be reacted with a mono-functional alcohol, such as a mono-functional alkyl alcohol, under art-recognized conditions, which results in the formation of a hydroxy alkoxylalkyl (meth)acrylate, such as 2-hydroxy-3-alkoxypropyl (meth)acrylate in the case of glycidyl (meth)acrylate.

With some embodiments of the present invention, forming the polymerization product of the monomer mixture includes: (i) converting at least a portion of the epoxy functional (meth)acrylate monomer of component (c) to a hydroxyl functional (meth)acrylate monomer before polymerization; and/or (ii) converting at least a portion of the epoxy functional (meth)acrylate monomer of component (c) to a hydroxyl functional (meth)acrylate monomer during polymerization; and/or (iii) converting one or more monomer units of the epoxy functional (meth)acrylate monomer of component (c) to a hydroxyl functional (meth)acrylate monomer unit after completion of the polymerization.

In accordance with some further embodiments of the present invention, converting, before polymerization, at least a portion of the epoxy functional (meth)acrylate monomer of component (c) to a hydroxyl functional (meth) acrylate monomer, includes, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

In accordance with some additional embodiments of the present invention, converting, during polymerization, at least a portion of the epoxy functional (meth)acrylate monomer of component (c) to a hydroxyl functional (meth) acrylate monomer, includes, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

With some further embodiments of the present invention, converting, after completion of the polymerization, one or more monomer units of the epoxy functional (meth)acrylate monomer of component (c) to a hydroxyl functional (meth) acrylate monomer unit, includes, reacting one or more monomer units of the epoxy functional (meth)acrylate monomer of component (c) with an active hydrogen functional material, such as, but not limited to: an alcohol, such as a mono-functional alcohol; and/or an acid, such as a mono-functional carboxylic acid.

The hydroxyl functional (meth)acrylate of component (c) can be present in an amount of 0.1 wt. % to 8 wt. %, based on total weight of the monomer mixture. With some embodiments, the hydroxyl functional (meth)acrylate of component (c) is present in an amount of at least 0.1 wt. %, or at least 0.25 wt. %, or at least 0.5 wt. %, or at least 0.75 wt. %, or at least 1.0 wt. %, or at least 2.0 wt. %, or at least 2.5 wt. %, or at least 3.0 wt. %, or at least 3.5 wt. %. With some further embodiments, the hydroxyl functional (meth)acrylate of component (c) can be present in an amount of less than or equal to 8.0 wt. %, or less than or equal to 7.5 wt. %, or less than or equal to 7.0 wt. %, or less than or equal to 6.5 wt. %, or less than or equal to 6.0 wt. %, or less than or equal to 5.5 wt. %, or less than or equal to 5.0 wt. % or less than or equal to 4.0 wt. %. The amount of hydroxyl functional (meth)acrylate of component (c) can range between any combination of these lower and upper threshold values, such as: from 0.1 wt. % to 8.0 wt. %, or from 0.5 wt. % to 7.0 wt. %, or from 1.0 wt. % to 6.5 wt. %, or from 1.0 wt. % to 4.0 wt. %, where each wt. % in each case is based on total weight of the monomer mixture. For example, the amount of the hydroxyl functional (meth)acrylate of component (c) can range between 0.1 wt. % to 8.0 wt. %, preferably from 0.5 wt. % to 6.0 wt. %, most preferably from 1.0 wt. % to 4.0 wt. %.

The epoxy functional (meth)acrylate monomer of component (c) can be present in an amount of 0.1 wt. % to 10 wt. %. With some embodiments, the epoxy functional (meth)acrylate monomer of component (c) is present in an amount of at least 0.25 wt. %, or at least 0.5 wt. %, or at least 1.0 wt. %, or at least 2.0 wt. %. With some further embodiments, the epoxy functional (meth)acrylate monomer of component (c) is present in an amount of less than or equal to 10.0 wt. %, or less than or equal to 7.0 wt. %, or less than or equal to 5.0 wt. %, or less than or equal to 4.0 wt. %. The amount of epoxy functional (meth)acrylate monomer, of component (c), can range between any combination of these lower and upper threshold values, such as: from 0.1 wt. % to 10.0 wt. %, or from 0.5 wt. % to 7.0 wt. %, or from 1.0 wt. % to 5.0 wt. %, or from 1.0 wt. % to 4.0 wt. %, where each wt. % in each case is based on total weight of the monomer mixture. For example, the epoxy functional (meth) acrylate monomer of component (c) can present in an amount from 0.1 wt. % to 10.0 wt. %, preferably from 0.5 wt. % to 7.0 wt. %, most preferably from 1.0 wt. % to 4.0 wt. %.

With some embodiments of the present invention, the pressure sensitive adhesive composition does not contain (and is free of) components having oxirane (or epoxy) functionality. With some further embodiments of the present invention, the monomer mixture, from which the polymerization product is prepared, does not contain (and is free of) components having oxirane (or epoxy) functionality.

The monomer mixture, from which the polymerization product of the present invention is prepared, includes (d) 0.05 to 3 wt. %, preferably 0.1 to 2.0 wt. %, most preferably from 0.15 to 1.0 wt. % of least one ureido substituted ethylenically unsaturated monomer.

The at least one ureido substituted ethylenically unsaturated monomer of component (d), with some embodiments, includes at least two ureido substituted ethylenically unsaturated monomers.

The at least one ureido substituted ethylenically unsaturated monomer of component (d), with some further embodiments, is selected from ureido substituted (meth) acrylate monomers, ureido substituted allyl monomers, and combinations thereof.

The at least one ureido substituted ethylenically unsaturated monomer component (d), with some additional embodiments, is selected from a $C_7$-$C_{17}$ ureido alkyl acrylate, a $C_7$-$C_{17}$ ureido alkyl methacrylate, and combinations thereof. With some further embodiments, the at least one ureido substituted ethylenically unsaturated monomer component (d) is selected from a $C_7$-$C_{17}$ ureido alkyl acrylate, a $C_7$-$C_{17}$ ureido alkyl methacrylate, and combinations thereof.

The at least one ureido substituted ethylenically unsaturated monomer component (d), in accordance with some embodiments, includes at least one or more of an oxygen atom, a nitrogen atom, and a silicon atom, in a spacer unit. In addition, and in accordance with some embodiments, the at least one ureido substituted ethylenically unsaturated monomer has a ureido functionality and a ethylenic functionality. Additionally, and with some embodiments, the spacer unit separates the ureido functionality from the ethylenic functionality. The ureido substituted ethylenically unsaturated monomer, can with some embodiments, include a spacer unit that includes at least one of an oxygen atom, a nitrogen, a silicon atom, and combinations of two or more thereof.

Examples of ureido substituted ethylenically unsaturated monomers of component (d), such as ureido alkyl (meth) acrylate monomers, include, but are not limited to: 2-(2-oxoimidazolidin-1-yl)ethyl 2-methylprop-2-enoate; 2-(1-methyl-2-oxoimidazolidin-1-ium-1-yl)ethyl 2-methylprop-2-enoate; dimethyl-[2-(2-methylprop-2-enoyloxy)ethyl]-[2-(2-oxoimidazolidin-1-yl)ethyl]azanium; dimethyl-[2-(2-methylprop-2-enoyloxy)ethyl]-[2-(2-oxoimidazolidin-1-yl) ethyl]azanium chloride; dimethyl-[2-(2-methylprop-2-enoyloxy)ethyl]-[1-(2-oxoimidazolidin-1-yl)ethyl]azanium; dimethyl-[2-(2-methylprop-2-enoyloxy)ethyl]-[1-(2-oxo-imidazolidin-1-yl)ethyl]azanium chloride; 2-(4-methyl-2-oxoimidazolidin-1-yl)ethyl 2-methylprop-2-enoate; 1-(2-oxoimidazolidin-1-yl)ethyl 2-methylprop-2-enoate; 2-(2-oxoimidazolidin-1-yl)ethyl 2-methylidenebutanoate; [1-acetamido-2-(2-oxoimidazolidin-1-yl)ethyl] 2-methylprop-2-enoate; [2-oxo-2-[2-(2-oxoimidazolidin-1-yl)ethylamino]ethyl] 2-methylprop-2-enoate; 2-(3-methyl-2-oxoimidazolidin-1-yl)ethyl 2-methylprop-2-enoate; [2-oxo-2-[2-(2-oxoimidazolidin-1-yl)ethoxy]ethyl] 2-methylprop-2-enoate; [2-oxo-2-[1-(2-oxoimidazolidin-1-yl) ethylamino] ethyl] 2-methylprop-2-enoate; and combinations of two or more thereof.

Examples of ureido substituted allyl monomers, of the ureido substituted ethylenically unsaturated monomer component (d), include, but are not limited to: 2-imidazolidinone, 1-(2-aminoethyl)-N,N-bis[2-hydroxy-3-(2-propenyloxy)propyl] and N-[2-hydroxy-3-(2-propenyloxy)propyl] derivatives, which are commercially available from Solvay S.A. under the tradename SIPOMER® WAM monomer, which is described as an allyl ether of a substituted urea.

The ureido substituted ethylenically unsaturated monomer of component (d) is present in an amount of 0.05 wt. % to 3 wt. %. With some embodiments, the ureido substituted ethylenically unsaturated monomer of component (d) is present in an amount of at least 0.05 wt. %, or at least 0.1 wt. %, or at least 0.15 wt. %, or at least 0.2 wt. %, or at least 0.5 wt. %, at least 0.75 wt. %. with some further embodiments, the ureido substituted ethylenically unsaturated monomer of component (d) is present in an amount of less than or equal to 3.0 wt. %, or less than or equal to 2.5 wt. %, or less than or equal to 2.0 wt. %, or less than or equal to 1.5 wt. %, or less than or equal 1.0 wt. %. The amount of ureido substituted ethylenically unsaturated monomer, of component (d), can range between any combination of these lower and upper threshold values, such as: from 0.05 wt. % to 3.0 wt. %; or from 0.1 wt. % to 2.0 wt. %, or from 0.1 wt. % to 1.5 wt. %; or from 0.15 wt. % to 1.0 wt. %, where each wt. % in each case is based on total weight of the monomer mixture. For example, the amount of the ureido substituted ethylenically unsaturated monomer, of component (d), can range from 0.05 wt. % to 3.0 wt. %; preferably from 0.1 wt. % to 2.0 wt. %, most preferably from 0.15 wt. % to 1.0 wt. %.

The monomer mixture from which the polymerization product is prepared, optionally includes, with some embodiments, (e) 0 to 6 wt. % at least one ethylenically unsaturated carboxylic acid.

Examples of ethylenically unsaturated carboxylic acid monomers of component (e) include, but are not limited to: monoethylenically unsaturated monocarboxylic acids, such as acrylic acid, methacrylic acid, ethacrylic acid, crotonic acid, β-carboxyethyl acrylate, vinyl acetic acid, and vinyl lactic acid; monoethylenically unsaturated dicarboxylic acids such as maleic acid, fumaric acid, itaconic acid, and citraconic acid; monoethylenically unsaturated tricarboxylic acids such as aconitic acid; halogen substituted derivatives of such ethylenically unsaturated carboxylic acid monomers, such as alpha-chloracrylic acid; anhydrides of such ethylenically unsaturated carboxylic acid monomers having at least two carboxylic acid groups, such as maleic anhydride and citraconic anhydride; and salts of such ethylenically unsaturated carboxylic acid monomers. An example of a vinyl acetic acid is 3-butenoic acid. An example of vinyl lactic acid includes 2-hydroxy-4-pentenoic acid. ethylenically unsaturated carboxylic acid monomers of component (e) can include 2-methyl-2-propene-1-sulfonic acid, styrene sulfonic acid, acrylamidomethyl propane sulfonic acid and the salts thereof. (Meth)acrylic acid, crotonic acid, itaconic acid, β-carboxyethyl acrylate, maleic acid, fumaric acid and combinations thereof are particularly preferred.

The ethylenically unsaturated carboxylic acid of component (e) is present in an amount of 0 wt. % to 6 wt. %, where each wt. % in each case is based on total weight of the monomer mixture. When present in the monomer mixture, the ethylenically unsaturated carboxylic acid of component (e) is present in an amount of greater than 0 wt. % to 6 wt. %. With some embodiments, the ethylenically unsaturated carboxylic acid of component (e) is present in an amount of at least 0.05 wt. %, or at least 0.1 wt. %, or at least 0.5 wt. %, or at least 1.0 wt. %, or at least 1.5 wt. %, or at least 2.0 wt. %, or at least 3.0 wt. %. The ethylenically unsaturated carboxylic acid of component (e), with some further embodiments, is present in an amount of less than or equal to 6.0 wt. %, or less than or equal to 5.0 wt. %, or less than or equal to 4.0 wt. %, or less than or equal to 4.5 wt. %, or less than or equal to 3.0 wt. %. The amount of ethylenically unsaturated carboxylic acid of component (e), can range between any combination of these lower and upper threshold values, such as: from 0.1 wt. % to 5.5 wt. %; or from 0.5 wt. % to 5.0 wt. %; or from 1.0 wt. % to 4.5 wt. %; or from 1.0 wt. % to 4.0 wt. %; or from 1.0 wt. % to 3.0 wt. %, where each wt. % in each case is based on total weight of the monomer mixture. For example, the amount of the ethylenically unsaturated carboxylic acid of component (e), can be less than 6.0 wt. %, preferably between 0.5 wt. % and 5.0 wt. %; most preferably between 1.0 wt. % and 3.0 wt. %.

The monomer mixture from which the polymerization product is prepared, optionally includes, with some embodiments, (f) 0 wt. % to 25 wt. % of at least one vinyl aromatic monomer.

Examples of vinyl aromatic monomers of component (f) include, but are not limited to: styrene; α-methylstyrene; vinyltoluene; o-methylstyrene; p-methylstyrene; p-tert-butylstyrene; 2,4-dimethylstyrene; 2-methylstyrene; 3-methylstyrene; 4-methylstyrene; 2-ethylstyrene; 3-ethylstyrene; 4-ethylstyrene; 2,4-diisopropylstyrene; 2,4-diethylstyrene; 4-t-butylstyrene; 5-t-butyl-2-methylstyrene; 2-chlorostyrene; 3-chlorostyrene; 4-chlorostyrene; 4-bromostyrene; 2-methyl-4,6-dichlorostyrene; 2,4-dibromostyrene; vinylnaphthalene; vinyltoluene; vinylxylene; 2-vinylpyridine; 4-vinylpyridine; 1,1-diphenylethylenes; substituted 1,1-diphenylethylenes; 1,2-diphenylethene; and substituted 1,2-diphenylethylenes. The vinyl aromatic monomer of component (f) can include combinations of two or more vinyl aromatic monomers.

The vinyl aromatic monomer of component (f), with some embodiments, is selected from styrene, methylstyrene, tert-butylstyrene, dimethylstyrene, ethylstyrene, diisopropylstyrene, dimethylstyrene, butyl-methylstyrene, chlorostyrene, bromostyrene methyl-dichlorostyrene, dibromostyrene, vinylnaphthalene, vinyltoluene, vinylxylene, vinylpyridine, diphenylethylenes, substituted diphenylethylenes, and mixtures thereof (such as combinations of two or more thereof).

The vinyl aromatic monomer of component (f) is present in an amount of 0 wt. % to 20 wt. %, where each wt. % in each case is based on total weight of the monomer mixture. When present in the monomer mixture, the vinyl aromatic monomer of component (f) is present in an amount of greater than 0 wt. % to 20 wt. %. With some embodiments, the vinyl aromatic monomer of component (f) is present in an amount of at least 0.05 wt. %, or at least 1.0 wt. %, or at least 1.5 wt. %, or at least 2.0 wt. %, or at least 2.5 wt. %, or at least 3.0 wt. %, or at least 3.5 wt. %, or at least 4.0 wt. %. The vinyl aromatic monomer of component (f), with some further embodiments, is present in an amount of less than or equal to 20 wt. %, or less than or equal to 18 wt. %, or less than or equal to 15 wt. %, or less than or equal to 10 wt. %. The amount of vinyl aromatic monomer of component (f) can range between any combination of these lower and upper threshold values, such as: from 0 wt. % to 20 wt. %; or from 1.0 wt. % to 18 wt. %; or from 1.5 wt. % to 15 wt. %, where each wt. % in each case is based on total weight of the monomer mixture. For example, the amount of the vinyl aromatic monomer of component (f) can range between from 0 wt. % to 20 wt. %; preferably from 1.0 wt. % to 18 wt. %; most preferably from 1.5 wt. % to 15 wt. %.

The monomer mixture from which the polymerization product is prepared can, with some embodiments, include (g) 0 to 25 wt. % of at least one ethylenically unsaturated monomer that is different from the monomers of components (a) through (f). With some embodiments, the ethylenically unsaturated monomer of component (g) is selected from vinyl esters of carboxylic acids (such as, of $C_1$-$C_5$ carboxylic acids, or $C_1$-$C_3$ carboxylic acids), nitriles of ethylenically unsaturated carboxylic acids, amides of ethylenically unsaturated carboxylic acids, ethylenically unsaturated hydrocarbon monomers, ethylenically unsaturated surfactants, and combinations thereof.

With some further embodiments, the ethylenically unsaturated monomer of component (g) is selected from vinyl esters of carboxylic acids (such as, of $C_1$-$C_5$ carboxylic acids, or of $C_1$-$C_3$ carboxylic acids), ethylenically unsaturated nitriles, ethylenically unsaturated amides, ethylenically unsaturated hydrocarbon monomers, ethylenically unsaturated surfactants, and combinations thereof.

Examples of vinyl esters of carboxylic acids of component (g) include, but are not limited to vinyl formate, vinyl acetate, vinyl propionate, and vinyl butyrate. Examples of nitriles of ethylenically unsaturated carboxylic acids (or ethylenically unsaturated nitriles) include, but are not limited to, acrylonitrile, methacrylonitrile, alpha-haloacrylonitriles, such as alpha-chloroacrylonitrile. Examples of amides of ethylenically unsaturated carboxylic acids (or ethylenically unsaturated amides) include, but are not limited to: unsubstituted ethylenically unsaturated amides, such as (meth)acrylamide; N-substituted ethylenically unsaturated amides, such as N-methylol(meth)acrylamide; and alkylated N-methylol(meth)acrylamides, such as N-methoxymethyl (meth) acrylamide.

Examples of ethylenically unsaturated hydrocarbon monomers of component (g) include, but are not limited to, ethylene, propylene, butylene, and conjugated dienes, such as butadiene, isoprene, and copolymers of butadiene and isoprene. Examples of ethylenically unsaturated surfactants include, but are not limited to, those ethylenically unsaturated surfactants described further herein with regard to the polymerization of the monomer mixture, such as alkylphenol ethoxylates containing alkenyl substituents.

The ethylenically unsaturated monomer of component (g) is present in the monomer mixture in an amount of 0 wt. % to 25 wt. %. When present in the monomer mixture, the ethylenically unsaturated monomer of component (g) is present in an amount of greater than 0 wt. % to 25 wt. %. With some embodiments, the ethylenically unsaturated monomer of component (g) is present in an amount of at least 0.05 wt. %, or at least 0.1 wt. %, or at least 0.5 wt. %, or at least 1.0 wt. %, or at least 2.0 wt. %, or at least 4.0 wt. % or at least 6.0 wt. %. The vinyl ethylenically unsaturated monomer of component (g), with some further embodiments, is present in an amount of less than or equal to 24 wt. %, or less than or equal to 22 wt. %, or less than or equal to 20 wt. %, or less than or equal to 18 wt. %, or less than or equal to 15 wt. %, or less than or equal to 14 wt. %, or less than or equal to 12 wt. %, or less than or equal to 10 wt. %, or less than or equal to 8 wt. %. The amount of ethylenically unsaturated monomer of component (g) can range between any combination of these lower and upper threshold values, such as: from 0.05 wt. % to 24 wt. %; or from 0.1 wt. % to 22 wt. %; or from 1.0 wt. % to 20 wt. %; or from 2.0 wt. % to 18 wt. %; or from 4.0 wt. % to 16 wt. %; or from 6.0 wt. % to 14 wt. %, where each wt. % in each case is based on total weight of the monomer mixture. For example, the amount of the ethylenically unsaturated monomer of component (g) can range between 0 wt. % and 25 wt. %; preferable between 0 wt. % and 20 wt. %; most preferably between 0 wt. % and 15 wt. %.

The pressure sensitive adhesive composition, with some embodiments of the present invention, further includes tackifiers, or polyolefin emulsions, or combinations of tackifiers and polyolefin emulsions. With some further embodiments, the tackifiers or polyolefin emulsion each independently include a carboxylated polyethylene copolymer. The presence of tackifiers and/or polyolefin emulsions, with some embodiments, improves the adhesive properties of the pressure sensitive adhesive composition of the present invention to certain substrates, such as metal substrates (such as, stainless steel) and/or to organic polymer substrates (such as, high density polyethylene).

Examples of tackifiers include, but are not limited to, rosin acids, rosin esters, terpenes, and hydrocarbon based tackifiers. Examples of commercially available tackifiers include, but are not limited to: AQUATAC 6085 tackifier, commercially available from Arizona Chemical; SNOWTACK FH95G tackifier, commercially available from Lawter Inc; TACOLYN 1070 tackifier, commercially available from Eastman Chemical Company; and DERMULSENE TR501 tackifier, commercially available from DRT (Les Derives Resiniques et Terpeniques).

Examples of polyolefin emulsions that can be included in the pressure sensitive adhesive composition of the present invention include, but are not limited to, polyethylene dispersions and polypropylene dispersions. With some embodiments, the polyolefin of the polyolefin emulsion can include acid functionality, such as carboxylic acid functionality. Examples of commercially available polyolefin emulsions include, but are not limited to: COHESA 0001 polyolefin emulsion, commercially available from Honeywell International Inc.; MICHEM PRIME 4990R polyolefin emulsion, commercially available from Michelman Inc.; and HYPOD 4501 polyolefin emulsion, commercially available from The Dow Chemical Company.

Tackifiers and/or polyolefin emulsions can each independently be present in the pressure adhesive composition of the present invention in an effective amount. With some embodiments, the tackifier and/or polyolefin emulsion are present in a combined or total amount of 1 wt. % to 60 wt. %, preferably from 5 wt. % to 40 wt. %, most preferably from 10 wt. % to 25 wt. %, where each weight percent is based on total solids of the pressure sensitive adhesive composition.

The pressure sensitive adhesive composition of the present invention, with some embodiments, can optionally include one or more additives. Examples of additives that can optionally be present in the pressure sensitive adhesive composition include, but are not limited to, antifoaming agents, wetting agents, thickeners, plasticizers, fillers, pigments, dispersants, antioxidants, biocides, and combinations thereof. Each additive can independently be present in an effective, amount, such as from 0.1 wt. % to 20 wt. %, preferably from 0.1 wt. % to 10 wt. %, most preferably from 0.1 wt. % to 5 wt. %, where each weight percent is based on total solids of the pressure sensitive adhesive composition.

The pressure sensitive adhesive composition, with some embodiments of the present invention, has a peel adhesion strength over a 15 minute dwell time to stainless steel, polypropylene, and polystyrene, that is over (or greater than) 3.0 lbs/inch (536 g/cm). The peel adhesion strength is determined in accordance with Method A of PSTC-101 (Pressure Sensitive Tape Council, US).

The pressure sensitive adhesive composition, with some further embodiments of the present invention, has: a peel adhesion strength over a 15 minute dwell time to HDPE that is over (or greater than) 1.4 lbs/inch (250 g/cm3.); a peel adhesion strength to Stainless Steel of over (or greater than) 3.2 lbs/inch (572 g/cm); and a peel adhesion strength to Polystyrene that is over (or greater than) 3.3 lbs/inch (589 g/cm), each being determined in accordance with Method A of PSTC-101.

In accordance with the present invention, there is provided a process for making the polymerization product of the present invention, which includes polymerizing a monomer mixture. The monomer mixture includes: components (a) through (d), as described herein; optionally at least one of components (d) through (g), as described herein; and optionally a tackifier, polyolefin emulsion, additive or combination thereof.

The polymerization further includes, with some embodiments: monitoring the temperature of the reaction medium during the polymerization step, and recording a maximum temperature, where the maximum temperature so recorded is that of (or corresponds to) a reaction exotherm peak; and adding an amount, such as the entire amount, of ureido substituted ethylenically unsaturated monomer of component (d) to components (a)-(c) and (e)-(g), after the exotherm peak is reached. Alternatively, the ureido substituted ethylenically unsaturated monomer of component (d) can be added (either entirely, or a portion thereof) before the exotherm peak is reached, or at the time that the exotherm peak is reached. With this process, and in accordance with some embodiments, the polymerization step is initially conducted with an initial monomer mixture that includes components (a)-(c), optionally at least one of components (e)-(g), and optionally one or more additives, and after the exotherm peak is reached (as determined by monitoring the initial reaction medium) the initial reaction medium is an intermediate reaction medium, and an amount, such as the entire amount, of ureido substituted ethylenically unsaturated monomer of component (d) is added to the intermediate reaction medium, which includes components (a)-(c) optionally at least one of components (e)-(g), and optionally one or more additives, in which the monomer components have undergone at least some degree of polymerization, so as to form a polymer. The process, with some embodiments, further includes treating the polymer with: glycidyl alkyl compounds or diol compounds; and/or converting the at least one ethylenically unsaturated carboxylic acid (e) into structural units corresponding to structural units resulting from polymerization of the at least one hydroxyl functional (meth)acrylate monomer (c).

In accordance with some embodiments of the present invention, there is provided a post-processing step that is performed on a redispersed polymer, dried polymer, or polymer latex resulting from the polymerization of the monomer mixture as described previously herein (collectively referred to as "the polymer"). The post-processing step, with some embodiments, includes treating the polymer with glycidyl alkyl compounds or diol compounds. This treatment at least partially converts structural units resulting from polymerization of the at least one ethylenically unsaturated carboxylic acid (e) into structural units corresponding to structural units resulting from polymerization of the at least one hydroxyl functional (meth)acrylate monomer (c). To this end, the process, with some embodiments, includes providing the polymer and treating the polymer with glycidyl alkyl compounds or diol compounds. With some alternative embodiments, the process includes converting structural units resulting from polymerization of the at least one ethylenically unsaturated carboxylic acid (e) into structural units corresponding to structural units resulting from polymerization of the at least one hydroxyl functional (meth)acrylate monomer (c).

With some embodiments, the polymer resulting from polymerization of the monomer mixture as described previously herein, includes monomer units of ethylenically unsaturated carboxylic acid monomers of component (e). The polymer including monomer units of ethylenically unsaturated carboxylic acid monomers of component (e) can, with some embodiments, be subjected to a post-processing step that includes reacting the polymer with one or more glycidyl alkyl compounds (or oxirane/epoxy functional alkyl compounds), such as 1,2-epoxypropane, or one or more diol compounds, such as an alkylene glycol, such as ethylene glycol, propylene glycol, and butylene glycol. This reaction results in conversion of at least some of the carboxylic acid groups (—COOH) of the monomer units of ethylenically unsaturated carboxylic acid monomers of component (e) to carboxylic acid ester groups having hydroxyl functionality, which with some embodiments, correspond to or are equivalent to monomer units of hydroxyl functional (meth)acrylate monomers of component (c).

For purposes of non-limiting illustration, reaction of a carboxylic acid group (—COOH) of a monomer unit of ethylenically unsaturated carboxylic acid monomer of component (e) with 1,2-epoxypropane, would result in the formation of a 2-hydroxypropyl carboxylic acid ester group (—C(O)O—CH$_2$—CH(OH)CH$_3$). For purposes of further non-limiting illustration, reaction of the carboxylic acid group of a (meth)acrylic acid monomer unit (which is a monomer unit of an ethylenically unsaturated carboxylic acid monomer of component (e)) with 1,2-epoxypropane, would result in conversion of the (meth)acrylic acid monomer unit to a 2-hydroxypropyl (meth)acrylate monomer unit, which would correspond to a monomer unit of a hydroxyl function (meth)acrylate monomer of component (c).

In accordance with the present invention, there is provided an article that includes the pressure sensitive adhesive composition of the present invention and as described previously herein, in which the pressure sensitive adhesive composition is freely applied to (or applied directly to) the article, or is applied to the article as an adhesive tape containing a first surface. In accordance with some embodiments of the present invention, the pressure sensitive adhesive composition is applied as an adhesive tape containing a first surface, and wherein the adhesive tape is further mounted on to a second surface, wherein the second surface includes a surface to which the pressure sensitive adhesive does not strongly adhere, wherein the second surface is made of (or includes) a silicone based material.

The polymerization product of the pressure sensitive adhesion composition according to the present invention can be prepared in accordance with art-recognized polymerization methods. In accordance with some embodiments, the polymerization product is prepared by a one-stage polymerization process, and can be referred to as a one-stage polymerization product. By one-stage polymerization process it is meant that the polymerization is conducted in one stage (or a single stage) using a single homogenous monomer charge for making the polymerization product. Correspondingly a polymerization process using an external or internal seed having the same monomer composition as the monomer charge, used for making the polymerization product for purposes of adjusting the particle size, is not excluded. As a consequence the one-stage polymerization product is free of distinguishable domains within a polymer particle.

The polymerization process by which the polymerization product of the present invention is prepared, utilizes a continuous phase (usually water), and can involve the use of other art-recognized components such as, but not limited to initiators, reducing agents, surfactants, defoamers wetting agents, crosslinking agents, preservatives, and the like.

The use of a one-stage polymerization process, with some embodiments, can optionally include premixing the monomer mixture, which results in the formation of a pre-emulsion. The pre-emulsion can then be polymerized under batch conditions, semi-continuous conditions, continuous conditions, or a combination thereof. Polymerization of the pre-emulsion can, with some embodiments, be conducted in the presence of a seed latex having a monomer composition that is the same as the monomer mixture, which can be referred as an ab initio polymerization.

Polymerization of the monomer mixture can be conducted under any suitable temperature or combinations of temperatures, including one or more increasing temperature ramps, one or more decreasing temperature ramps, one or more temperature holds, and any combination thereof. With some embodiments, the polymerization is conducted at one or more temperatures of from 0° C. to 130° C., or 40° C. to 100° C., or from 25° C. to 95° C., or from 55° C. to 90° C. The polymerization can be conducted in the presence of one or more additives or auxiliary agents, such as initiators and/or emulsifiers and/or protective colloids.

Classes of initiators that can be used in the polymerization of the monomer mixture include, but are not limited to, water soluble initiators and/or oil-soluble initiators. Examples of initiators that can be used in the polymerization include art-recognized initiators, such as, but not limited to: azo compounds, such as, azobisisobutyronitrile (AIBN), 2,2'-azobis(2-methylpropionitrile) (AMBN), and cyanovaleric acid; inorganic peroxy compounds, such as, but not limited to, hydrogen peroxide, sodium, potassium and ammonium peroxydisulfate, peroxycarbonates, and peroxyborates; organic peroxy compounds, such as, but not limited to, alkyl hydroperoxides, dialkyl peroxides, acyl hydroperoxides, and diacyl peroxides, as well as esters, such as tertiary butyl perbenzoate, and combinations of inorganic and organic initiators.

The initiator can be present in the monomer mixture in an effective amount, or an effective initiating amount. Depending on the conditions under-which the polymerization is conducted, the initiator can be added in a single addition, a continuous addition during the polymerization, at different addition rates over the course of the polymerization, or combinations thereof. Alternatively, the monomer can be added shot wise or by aliquot. With some embodiments, the initiator is present in an amount (such as a total amount) of from 0.01 wt. % to 3.0 wt. %, preferably from 0.1 wt. % to 3.0 wt. %, most preferably from 0.01 wt. % to 1 wt. %, where each wt. % is based on the weight of the monomer mixture.

The initiator can be used alone or, with some embodiments, in combination with one or more reducing agents. Examples of such reducing agents that can be used in the polymerization include, but are not limited to, sulfur dioxide, alkali metal disulfites, alkali metal and ammonium hydrogen sulfites, thiosulfates, dithionites and formaldehyde sulfoxylates, hydroxylamine hydrochloride, hydrazine sulfate, iron (II) sulfate, cuprous naphthanate, chelated iron salts, glucose, sulfonic acid compounds such as sodium methane sulfonate, amine compounds such as dimethylaniline and ascorbic acid. Alternatively, or additionally commercially available mixtures of reducing agents can be used in the polymerization, examples of which include, but are not limited to, BRUGGOLITE FF6 reducing agent or BRUGGOLITE FF6M reducing agent, which are commercially available from Briiggemann Chemical. The reducing agent can be used in any suitable amount. With some embodiments, the reducing agent is present in an amount of from 0.03 parts by weight to 10 parts by weight, in each case by (or based on the) weight of the polymerization initiator.

With some embodiments, the polymerization is conducted using one or more water soluble initiators in combination with one or more reducing agents, such as tert-butyl hydroperoxide in combination with sodium formaldehyde sulfoxylate, and optionally in further combination with a chelated ferric complex catalyst.

The polymerization is conducted, with some embodiments, in the presence of one or more art-recognized surfactants and/or emulsifiers, which stabilize the emulsion (or latex) or colloid particles. The surfactants and/or emulsifiers can be added in an effective amount (or effective stabilizing amount) to the aqueous phase and/or the monomer phase.

Classes of surfactants that can be used with the polymerization include, but are not limited to, anionic surfactants, cationic surfactants, non-ionic surfactants, amphoteric surfactants, and combinations thereof. The surfactants can be linear or branched alkyl and/or cyclo alkyl surfactants. Examples of anionic surfactants that can be used in the polymerization include, but are not limited to, alkyl sulfates, sulfates of ethoxylate alcohols, aryl sulfonates, phosphates of ethoxylated alcohols, sulfosuccinates, sulfates and sulfonates of ethoxylated alkylphenols, and combinations thereof. Examples of cationic surfactants that can be used in the polymerization include, but are not limited to, ethoxylated fatty amines and salts thereof.

Examples of nonionic surfactants that can be used in the polymerization include, but are not limited to, ethoxylated alcohols, ethoxylated alkylphenols, and mixtures thereof. With some embodiments environmentally benign nonionic surfactants can be used, and include linear and/or branched alkyl ethoxylates that are (alkyl phenyl ethoxylate)-free, such as (nonylphenol ethoxylate)-free. An example of a commercially available nonionic surfactant is ABEX® 2535 surfactant, which is commercially available from Solvay S.A.

With some embodiments, one or more reactive surfactants having a radically polymerizable carbon-carbon double bond, which can be referred to as ethylenically unsaturated surfactants, can be used in the polymerization. Examples of reactive surfactants include, but are not limited to, alkylphenol ethoxylates containing alkenyl substituents, polyoxyalkylene-1-(allyloxymethyl) alkyl ether sulfate salt compounds, salts of poly(oxy-1,2-ethanediyl), alpha-sulfo-omega-[1-(hydroxymethyl)-2-(2-propenyloxy) ethoxy] (such as, ADEKA SR Series reactive surfactants, commercially available from Adeka Corporation), and combinations thereof. With some embodiments, the reactive surfactant includes an ADEKA SR Series reactive surfactant.

Further examples of surfactants that can be used in the polymerization include, but are not limited to: saturated and ethylenically unsaturated sulfonic acids or salts thereof, including, but not limited to, unsaturated hydrocarbonsulfonic acid, such as vinylsulfonic acid, allylsulfonic acid and methallylsulfonic acid, and salts thereof; aromatic hydrocarbon acids, including but not limited to, p-styrenesulfonic acid, isopropenylbenzenesulfonic acid and vinyloxybenzenesulfonic acid and salts thereof; sulfoalkyl esters of acrylic acid and methacrylic acid, including but not limited to, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols, fatty alcohol (poly)ethersulfates and salts thereof.

The surfactants and/or emulsifiers can be present in an effective amount, such as from 0.2 wt. % to 5 wt. %, preferably from 1 wt. % to 5 wt. %, most preferably from 1 wt. % to 3 wt. %, each wt. % being based on the total weight of monomers of the monomer mixture. With some embodiments, at least a portion of the surfactants and/or emulsifiers is used to form the pre-emulsion, and the remainder of surfactants and/or emulsifiers, if any, is additionally and separately added during the polymerization.

In accordance with some embodiments of the present invention, one or more protective colloids can be used in place of or in conjunction with the surfactants and/or emulsifiers in the polymerization. Examples of suitable colloids include, but are not limited to, polyhydroxy compounds, such as partially acetylated polyvinyl alcohol, casein, hydroxyethyl starch, carboxymethylcellulose, hydroxyethylcellulose, hydroxypropylcellulose, dextrins, polyethylene glycol and gum arabic. The protective colloids can be used in an effective amount, such as from 0.1 parts by weight to 10 parts by weight, preferably from 0.1 parts by weight to 5 parts by weight, most preferably from 0.1 parts by weight to 2 parts by weight, the parts by weight being based on the total weight of the monomers of the monomer mixture.

With some further embodiments of the present invention, the polymerization is conducted in the presence of one or more buffer agents and/or chelating agents. Examples of buffer agents include, but are not limited to, alkali metal carbonates or hydrogen carbonates or ammonium salts thereof, or alkali metal phosphates and pyrophosphates or ammonium salts thereof. Examples of chelating agents include, but are not limited to, alkali metal salts of ethylenediaminetetraacetic acid (EDTA) and alkali metal salts of hydroxyl-2-ethylenediaminetriacetic acid (HEEDTA). The buffer agents and chelating agents are each used in an effective amount, such as independently in each case from 0.001 wt. % to 1.0 wt. %, the percent weights being based on the total weight of monomers in the monomer mixture.

After completion of the polymerization, and in accordance with some embodiments, the pH of the emulsion (or latex emulsion) or colloid is adjusted by the addition of a suitable base including, but not limited to, alkali metal hydroxides, ammonium hydroxide, amines, hydroxyalkyl amines, and combinations thereof. The pH is adjusted to at least 6.0, preferably from 6.5 to 9.5, most preferably from 7.0 to 9.0, with some embodiments.

The polymerization product of the pressure sensitive adhesive composition of the present invention has, with some embodiments, a solids content of from 30 wt. % to 70 wt. %, most preferably from 40 wt. % to 55 wt. %, the weight percent being based on the total weight of the polymerization product.

The present invention is more particularly described in the following examples, which are intended as illustrative only, since numerous modifications and variations therein will be apparent to those skilled in the art.

EXAMPLES

The following abbreviations are used in the examples.
2-EHA 2-Ethylhexyl acrylate
BA n-Butyl acrylate
MMA Methyl methacrylate
ST Styrene
VV10 Vinyl ester of VERSATIC acid, also known as VEOVA 10 VERSATIC acid.
AA Acrylic acid
HEA 2-Hydroxyethyl acrylate
UM N-(2-Methacryloyloxyethyl) ethylene urea (same as 2-(2-oxoimidazolidin-1-yl)ethyl 2-methylprop-2-enoate)
HDPE High density polyethylene
PP polypropylene
PS polystyrene
SS stainless steel Example 1 (Comparative)

A pre-emulsion was formed by mixing 231.3 g water, 25.4 g DOWFAX 2A1 (a proprietary alkyldiphenyloxide disulfonate, supplied by Dow), 4.6 g ABEX 2535 (a proprietary alkyl phenol ethoxylate-free, non-ionic surfactant, supplied by Solvay), 380.4 g 2-EHA, 270.1 g BA, 59.0 g MMA, 22.8 g ST, 11.4 g AA, 15.2 g HEA and 1.9 g UM. Two separate solutions were prepared: (A) 2.3 g sodium persulfate in 54.8 g water; and (B) 1.5 g sodium persulfate in 13.7 g water. An amount of 349 g water and 1.0 g DOWFAX 2A1 surfactant were charged to the reactor. Nitrogen purge was started and heating to 78° C. took place. At 78° C., 31 g of the pre-emulsion was added to the reactor. Solution (B) was charged to the reactor and flushed with 3 g water. Nitrogen purge was turned off, and the reaction exotherm began. Fifteen minutes after the exotherm peaked, the mixture from the pre-emulsion tank and solution (A) was allowed to flow into the reactor for 3.5 hours and the reactor temperature was controlled at 85° C. After the flow was complete, the pre-emulsion storage vessel and line etc. was flushed with 8 g water and the reactor held at 87° C. for 45 minutes then cooled. Solution (C) composed of 2.7 g t-butyl hydroperoxide in 20 g water, and solution (D) composed of 1.2 g sodium formaldehyde sulfoxylate in 16 g water, were prepared. Flow of solutions (C) and (D) to the reactor over 45 minutes was started, and the reactor was held for another 15 minutes. The reactor was cooled to room temperature and the pH was adjusted to 6.0-8.0 with 28% aqueous ammonia solution. One percent AEROSOL OT-75 emulsifier (from Cytec Solvay Group) based on the total weight was added and mixed for 1 hour.

Examples 2 to 8

Examples 2 to 8 were each conducted as described in Example 1, except that VV10 was incorporated into the monomer feed, together with the other changes to the monomer composition as set forth in the following Table 1.

TABLE 1

| | Monomer Charge | | | | | | | |
|---|---|---|---|---|---|---|---|---|
| | Ex 1 (comp.) | Ex 2 | Ex 3 | Ex 4 | Ex 5 | Ex 6 | Ex 7 | Ex 8 |
| 2-EHA | 50 | 50 | 50 | 50 | 50 | 50 | 50 | 50 |
| BA | 35.5 | 30.5 | 15.5 | 10.5 | 32.5 | 25.5 | 23.5 | 23.5 |
| MMA | 7.75 | 7.75 | 7.75 | 7.75 | 7.75 | 7.75 | 7.75 | 7.75 |
| ST | 3 | 3 | 3 | 3 | 3 | 3 | 10 | 12 |
| VV10 | 0 | 5 | 20 | 25 | 3 | 10 | 5 | 3 |
| AA | 1.5 | 1.5 | 1.5 | 1.5 | 1.5 | 1.5 | 1.5 | 1.5 |
| HEA | 2 | 2 | 2 | 2 | 2 | 2 | 2 | 2 |
| UM | 0.25 | 0.25 | 0.25 | 0.25 | 0.25 | 0.25 | 0.25 | 0.25 |

Experimental Methods for Determining the Peel Adhesion Values to Both Polar and Non-Polar Surfaces The pressure sensitive adhesive samples of Examples 1-8 were tested by coating onto 2 mm PET film (supplied by ChemInstruments), air dried at room temperature for 30 minutes and then further dried at 110° C. in an oven for 3 minutes with a target dried adhesive coat weight of 50 g/m². The coated PET was then laminated to a release liner (silicone-based release paper supplied by ChemInstruments).

The PET/adhesive/liner construction was cut into 2.54 cm wide stripes, the release liner was removed, and the PET film with adhesive was laminated to stainless steel (SS) coupons for peel testing. The test method used was the Pressure Sensitive Tape Council (USA) method, PSTC-101, Method A, using a 15-minute dwell time. After adhering the construct to the SS test panel, it was rolled twice using a 2 kg weight roller. 180 degree peel tests were run after the specified dwell time had elapsed, using either an Instron Tester model 5564 or model 3369. The Peel adhesion values (PL15) were calculated from the average of 3 repeat test runs.

Substrates used for these PL15 tests were: HDPE, high density polyethylene panel (supplied by ChemInstruments); PP, polypropylene panel (supplied by ChemInstruments); PS, polystyrene panel, (supplied by ChemInstruments); and SS, stainless steel panel (supplied by ChemInstruments).

The sample strips were also tested for SAFT (Shear Adhesion Failure Temperature) using the Pressure Sensitive Tape Council (USA) method, PSTC-17.

For purposes of illustration, the testing of a stainless steel panel as the substrate is provided as follows.

The adhesive/PET/release liner construct was cut into 1-inch wide stripes with a length of 6 inches (15.24 cm) and the PET film was reinforced with aluminum foil tape on the obverse side to avoid tearing at high temperature. The aluminum tape (Al) was 324A™ UL 181A-P & B-FX Listed premium cold weather foil tape, supplied by NASHUA Tape Products. The adhesive/PET/Al construct was adhered to a stainless steel panel with 1 inch by 1 inch contact area and then rolled twice using a 2 kg weight roller. The steel panel coated with the strip was then placed in to a rack, in an oven held at 40'C, such that the panel formed an angle of 178° to 180° to the vertical. The oven used was an SO-8 Shear Test Oven supplied by ChemInstruments, and included a forced-ventilation oven with a ramping controller. The conditioning time in the oven for the steel panel with the adhesive strip was 30 minutes. Then a 1-kg weight was hung on to the adhesive strip, the oven was programmed to hold at 40° C. for 20 minutes immediately after the weight was attached. Following this 20 minutes hold, the oven temperature automatically increased at a programmed rate of 0.5° C. per minute. When the oven temperature reached 200° C., the test was completed and the oven started to cool. When the 1-kg weight dropped due to the failure of the test strip on the steel coupon, the temperature was recorded as the SAFT value. If the test strip did not fail throughout the course of the temperature rise, the SAFT was recorded as 200+° C. The SAFT values were calculated from the average of 3 repeat test runs.

The test method as described above with regard to a stainless steel panel, was then repeated on the different substrates.

The results of the testing are summarized in the following Table 2.

TABLE 2

Adhesive Properties

|  | Ex 1 (comp) | Ex 2 | Ex 3 | Ex 4 | Ex 5 | Ex 6 | Ex 7 | Ex 8 |
|---|---|---|---|---|---|---|---|---|
| PL15 (SS) (lbs/inch) | 2.08 | 2.96 | 3.41 | 3.64 | 2.86 | 2.83 | 3.26 | 3.26 |
| PL15 (HDPE) (lbs/inch) | 0.75 | 0.96 | 1.03 | 1.10 | 0.95 | 0.99 | 1.47 | 1.00 |
| PL15 (PP) (lbs/inch) | 2.21 | 2.30 | 3.08 | 3.26 | 2.47 | 2.42 | 2.63 | 2.23 |
| PL15 (PS) (lbs/inch) | 2.66 | 2.73 | 3.11 | 3.04 | 2.78 | 2.75 | 3.38 | 3.33 |
| SAFT (° C.) | 200+ | 200+ | 200+ | 109 | 200+ | 200+ | 200+ | 200+ |

The influence of the VV10 content on the peel adhesion values on hydrophobic surfaces is discussed in further detail as follows.

Adhesion to HDPE:

Table 2 demonstrates for Ex. 1 (comp) that the absence of VV10 resulted in a low PL15 value (0.75 lbs/inch), maintaining the level of styrene at 3 phr, but increasing the VV10 content from 3 phr (Ex.5) to 5 phr (Ex.2) resulted in PL15 values of 0.95 and 0.96 lb/inch respectively. Increasing the VV10 content to 10 phr (Ex. 6) increased the PL15 value to 0.99 lbs/inch. Maintaining the level of styrene at 3 phr, but increasing the VV10 content to 20 phr (Ex.3) resulted in an increased PL15 value of 1.03 lbs/inch, and increasing the VV10 further, to 25 phr (Ex. 4) increased the PL15 value to 1.10 lbs/inch.

Adhesion to PP:

Table 2 demonstrates for Ex. 1 (comp) that the absence of VV10 results in a low PL15 value (2.21 lbs/inch), maintaining the level of styrene at 3 phr, but increasing the VV10 content to 3 phr (Ex.5) resulted in a PL15 value of 2.47 lb/inch, increasing the VV10 content to 5 phr (Ex. 2) gave a PL15 value of 2.30 lbs/inch. Maintaining the level of styrene at 3 phr, but increasing the VV10 content to 10 phr (Ex.6) resulted in a PL15 value of 2.42 lbs/inch, increasing the VV10 further, to 20 phr (Ex. 3) increased the PL15 value to 3.08 lbs/inch and increasing the VV10 further, to 25 phr (Ex. 4) increased the PL15 value to 3.26 lbs/inch.

Adhesion to PS:

Table 2 demonstrates for Ex. 1 (comp) that the absence of VV10 resulted in a low PL15 value (2.66 llbs/inch), maintaining the level of styrene at 3 phr, but increasing the VV10 content to 3 phr (Ex.5) resulted in a PL15 value of 2.78 lb/inch, increasing the VV10 content to 5 phr (Ex. 2) gave a PL15 value of 2.73 lbs/inch. Maintaining the level of styrene at 3 phr, but increasing the VV10 content to 10 phr (Ex.6) resulted in a PL15 value of 2.75 lbs/inch, increasing the VV10 further, to 20 phr (Ex. 3) increased the PL15 value to 3.11 lbs/inch, and increasing the VV10 further, to 25 phr (Ex. 4) decreased the PL15 value to 3.04 lbs/inch.

The influence of the VV10 content on the peel adhesion values on a metal (stainless steel) surface is discussed in further detail as follows.

Adhesion to SS:

Table 2 demonstrates for Ex. 1 (comp) that the absence of VV10 resulted in a low PL15 value (2.08 llbs/inch), maintaining the level of styrene at 3 phr, but increasing the VV10 content to 3 phr (Ex.5) resulted in a PL15 value of 2.86 lb/inch, increasing the VV10 content to 5 phr (Ex. 2) gave a PL15 value of 2.96 lbs/inch. Maintaining the level of styrene at 3 phr, but increasing the VV10 content to 10 phr (Ex.6) resulted in a PL15 value of 2.83 lbs/inch, increasing the VV10 further, to 20 phr (Ex. 3) increased the PL15 value to 3.41 lbs/inch, and increasing the VV10 further, to 25 phr (Ex. 4) increased the PL15 value to 3.64 lbs/inch.

SAFT values are discussed as follows.

All examples achieved the desired SAFT value of greater than 200° C., with the exception of Ex. 4, which had the highest VV10 content of 25 phr.

The influence of the styrene content on the peel adhesion values on hydrophobic surfaces is discussed as follows.

Comparing examples 2 and 7, each with a VV10 content of 5 phr, demonstrated that increasing the styrene content from 3 to 10 phr improved the peel values on all surfaces.

Comparing examples 5 and 8, each with a VV10 content of 3 phr, did not demonstrate a discernible trend upon increasing the styrene content from 3 to 12 phr improved the peel values on all surfaces.

The present invention can be further characterized by one or more of the following non-limiting clauses 1-35.

Clause 1: A pressure sensitive adhesive composition comprising a polymerization product of a monomer mixture, the monomer mixture comprising the following components:
(a) more than 30 wt. % of at least one alkyl ester of (meth)acrylic acid or cyclic hydrocarbon acrylates;
(b) 0.1 to less than 25 wt. % of at least one vinyl ester of $C_4$-$C_{20}$ carboxylic acids;
(c) 0.1 to 8 wt. % of at least one hydroxyl functional (meth)acrylate monomer, or 0.1 to 10 wt. % of at least one epoxy functional (meth)acrylate monomer;
(d) 0.05 to 3 wt. % of least one ureido substituted ethylenically unsaturated monomer;
(e) 0 to 6 wt. % at least one ethylenically unsaturated carboxylic acid;
(f) 0 to 20 wt. % of at least one vinyl aromatic monomer; and
(g) 0 to 25 wt. % of at least one ethylenically unsaturated monomer different from monomers (a) to (f), wherein the wt. % is based on the total weight of the monomer mixture.

Clause 2: The pressure sensitive adhesive composition of clause 1, wherein component (a) comprises:
(i) a first alkyl ester of (meth)acrylic acid of more than 30 wt. % and (ii) a second alkyl ester of (meth)acrylic acid of more than 12 wt. %.

Clause 3: The pressure sensitive adhesive composition of clause 1, wherein component (a) comprises:
(i) a first alkyl ester of (meth)acrylic acid of more than 30 wt. %, (ii) a second alkyl ester of (meth)acrylic acid of more than 12 wt. %, and (iii) a third alkyl ester of (meth)acrylic acid between 0.5 to 30 wt. %.

Clause 4: The pressure sensitive adhesive composition of clause 1, wherein component (a) comprises: (i) a first alkyl ester of (meth)acrylic acid of more than 30 wt. %, (ii) a second alkyl ester of (meth)acrylic acid of more than 12 wt. %, (iii) a third alkyl ester of (meth)acrylic acid of between 0.5 to 30 wt. %, and (iv) a fourth alkyl ester of (meth)acrylic acid of less than 12 wt. %.

Clause 5: The pressure sensitive adhesive composition of clause 4 wherein the first (i), second (ii), third (iii) and fourth (iv) alkyl ester (meth)acrylic acids of component (a) total between 70 to 85% by weight of monomers (a) to (g).

Clause 6: The pressure sensitive adhesive composition of clause 2, wherein the first (i) and second (ii) alkyl esters of (meth)acrylic acids each produce homopolymers of Tg of less than −20° C.

Clause 7: The pressure sensitive adhesive composition of clause 4, wherein the first (i) and second (ii) alkyl ester of (meth)acrylic acids each produce homopolymers of Tg less than −20° C.; and the third (iii) alkyl ester of (meth)acrylic acid produces homopolymers of Tg greater than 50° C.;
the at least one vinyl aromatic monomer of component (f) is present from 1-15% wt;
the third (iii) alkyl ester of (meth)acrylic acid and the at least one vinyl aromatic monomer of component (f) are hard monomers and total less than 20% by weight; and
wherein the first (i), second (ii), and fourth (iv) alkyl ester of (meth)acrylic acids total between 60 to 85% wt.

Clause 8: The pressure sensitive adhesive composition of clause 1, wherein the at least one ureido substituted ethylenically unsaturated monomer of component (d) comprises at least two ureido substituted ethylenically unsaturated monomers.

Clause 9: The pressure sensitive adhesive composition of clause 1, wherein the at least one alkyl ester of (meth)acrylic acid or cyclic hydrocarbon acrylates of component (a) is a $C_1$-$C_{18}$ alkyl (meth)acrylate.

Clause 10: The pressure sensitive adhesive composition of clauses 1, 8, or 9, wherein the at least one alkyl ester of (meth)acrylic acid or cyclic hydrocarbon acrylates of component (a) comprises an isobornyl (meth)acrylate.

Clause 11: The pressure sensitive adhesive composition of clauses 1, 8, 9, or 10, wherein component (c) comprises the at least one hydroxyl functional (meth)acrylate monomer (c), and the at least one hydroxyl functional (meth)acrylate monomer (c) is a $C_1$-$C_{17}$ hydroxy alkyl (meth)acrylate.

Clause 12: The pressure sensitive adhesive composition of clauses 1, 8, 9, 10, or 11, wherein component (c) comprises the at least one epoxy functional (meth)acrylate monomer (c), and the at least one epoxy functional (meth)acrylate monomer (c) is selected from glycidyl (meth)acrylate, $C_1$-$C_{17}$ hydroxyalkyl (meth)acrylate glycidyl ether, and combinations thereof.

Clause 13: The pressure sensitive adhesive composition of clauses 1, 8, 9, 10, 11, or 12, wherein the at least one hydroxyl functional (meth)acrylate monomer (c) is selected from hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxyhexyl methacrylate, hydroxyethylhexyl acrylate, hydroxyethylhexyl methacrylate, and combinations thereof.

Clause 14: The pressure sensitive adhesive composition of clauses 1, 8, 9, 10, 11, 12, or 13 wherein the at least one ureido substituted ethylenically unsaturated monomer component (d) is selected from ureido substituted (meth)acrylate monomers, ureido substituted allyl monomers, and combinations thereof.

Clause 15: The pressure sensitive adhesive composition of clause 14, wherein the at least one ureido substituted ethylenically unsaturated monomer component (d) is a $C_7$-$C_{17}$ ureido alkyl acrylate or a $C_7$-$C_{17}$ ureido alkyl methacrylate.

Clause 16: The pressure sensitive adhesive composition of clause 14, wherein the at least one ureido substituted ethylenically unsaturated monomer component (d) comprises at least one or more oxygen, nitrogen, silicon atom in a spacer unit,
wherein the at least one ureido substituted ethylenically unsaturated monomer has a ureido functionality and a ethylenic functionality, and wherein the spacer unit separates the ureido functionality from the ethylenic functionality.

Clause 17: The pressure sensitive adhesive composition of clauses 1, 8, 9, 10, 11, 12, 13, 14, 15, or 16 wherein the at least one vinyl ester of $C_4$-$C_{20}$ carboxylic acids of component (b) comprises a vinyl ester of a $C_5$-$C_{12}$ carboxylic acid.

Clause 18: The pressure sensitive adhesive composition of clause 17, wherein the vinyl ester of a $C_5$-$C_{12}$ carboxylic acid is a vinyl ester of a branched $C_5$-$C_{10}$ carboxylic acid.

Clause 19: The pressure sensitive adhesive composition of clause 18, wherein the vinyl ester of a branched $C_5$-$C_{10}$ carboxylic acid contains a quaternary carbon.

Clause 20: The pressure sensitive adhesive composition of clauses 18 or 19, wherein the quaternary carbon of the vinyl ester of the branched $C_8$-$C_{10}$ carboxylic acid quaternary carbon is bonded to an isobutyl group, a methyl group, a propyl group, and a carboxylic ester group.

Clause 21: The pressure sensitive adhesive composition of clauses 1, 8, 9, 10, 11, 12, 13, 14, 15, 16, 17, 18, 19, or 20 wherein the at least one vinyl aromatic monomer (f) is selected from styrene, methylstyrene, tert-butylstyrene, dimethylstyrene, ethylstyrene, diisopropylstyrene, dimethylstyrene, butyl-methylstyrene, chlorostyrene, bromostyrene methyl-dichlorostyrene, dibromostyrene, vinylnaphthalene, vinyltoluene, vinylxylene, vinylpyridine, diphenylethylenes, substituted diphenylethylenes, and mixtures thereof.

Clause 22: The pressure sensitive adhesive composition of clauses 1, 8, 9, 10, 11, 12, 13, 14, 15, 16, 17, 18, 19, 20, or 21 wherein the at least one ethylenically unsaturated monomer component (g) is selected from vinyl esters of $C_1$-$C_3$ carboxylic acid monomers, nitriles of ethylenically unsaturated carboxylic acids, ethylenically unsaturated surfactants, and combinations thereof.

Clause 23: The pressure sensitive adhesive composition of any one of clauses 1 through 22, further comprising tackifiers or polyolefin emulsions or combinations thereof.

Clause 24: The pressure sensitive adhesive composition of clause 23, wherein the tackifiers or polyolefin emulsion comprise a carboxylated polyethylene copolymer.

Clause 25: The pressure sensitive adhesive composition of any one of clauses 1 through 24, wherein the pressure sensitive composition has a peel adhesion strength over a 15 minute dwell time to Stainless Steel, Poly Propylene and Polystyrene is over 3.0 lbs/inch according to method A of PSTC-101.

Clause 26: The pressure sensitive adhesive composition of one of clauses 1 through 25, wherein the pressure sensitive composition has a peel adhesion strength over a 15 minute dwell time to HDPE is over 1.4 lbs/inch, a peel adhesion strength to Stainless Steel of over 3.2 lbs/inch, and a peel adhesion strength to Polystyrene is over 3.3 lbs/inch according to method A of PSTC-101.

Clause 27: A process for making the polymerization product of the monomer mixture of any one of clauses 1 through 24, comprising,
　　polymerizing, by a polymerization step, the monomer mixture,
　　monitoring temperature, during the polymerization step, and
　　recording a maximum temperature during the polymerization step,
　　wherein the maximum temperature recorded during the monitoring is that of a reaction exotherm peak, and
　　wherein the entire amount of the at least one ureido substituted ethylenically unsaturated monomer (d) is added to components (a)-(c) and (e)-(g) after the maximum temperature is reached.

Clause 28: A post-processing step performed on a redispersed polymer, dried polymer or polymer latex (collectively, the "polyer") resulting from polymerizing, by polymerization, the monomer mixture of any one of clauses 1 through 24, wherein the post-processing step comprises,
　　treating the polymer with glycidyl alkyl compounds or diol compounds to at least partially convert structural units resulting from polymerization of the at least one ethylenically unsaturated carboxylic acid (e) into structural units which can result from polymerization of the at least one hydroxyl functional (meth)acrylate monomer (c).

Clause 29: The pressure sensitive adhesive composition of any one of clauses 1 through 24, wherein the composition does not contain (is free of) components having oxirane functionality.

Clause 30: An article comprising the pressure sensitive adhesive composition of any one of clauses 1 through 24, wherein the pressure sensitive adhesive composition is freely applied to the article or is applied as an adhesive tape containing a first surface, and wherein the article is an automotive; marine vessel; electronic component; furnace; pyrolysis unit; exhaust gas equipment; subterranean piping; subterranean construction enabling the conveyance of crude oil/gas; industrial hot utility equipment; reactor vessel containing reactants for performing an exothermic reaction; rotating machinery such as centrifuges, space equipment, geothermal apparatus, or medical implants; or any other suitable article.

Clause 31: The article of clause 30, wherein the pressure sensitive adhesive composition is applied as an adhesive tape containing a first surface, and wherein the adhesive tape is further mounted on to a second surface wherein the second surface comprises a surface to which the pressure sensitive adhesive does not strongly adhere, wherein the second surface is made of a silicone based material.

Clause 32: A method of forming the polymerization product of the monomer mixture of any one of clauses 1 through 24, comprising:
　　converting at least a portion of the epoxy functional (meth)acrylate monomer of component (c) to a hydroxyl functional (meth)acrylate monomer, before polymerization; and/or
　　converting at least a portion of the epoxy functional (meth)acrylate monomer of component (c) to a hydroxyl functional (meth)acrylate monomer, during polymerization; and/or
　　converting one or more monomer units of the epoxy functional (meth)acrylate monomer of component (c) to a hydroxyl functional (meth)acrylate monomer unit, after completion of the polymerization.

Clause 33: The method of clause 32, wherein:
　　converting, before polymerization, at least a portion of the epoxy functional (meth)acrylate monomer of component (c) to a hydroxyl functional (meth)acrylate monomer, comprises, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 34: The method of clauses 32 or 33, wherein:
　　converting, during polymerization, at least a portion of the epoxy functional (meth)acrylate monomer of component (c) to a hydroxyl functional (meth)acrylate monomer, comprises, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 35: The method of clauses 32, 33, or 34, wherein:
　　converting, after completion of the polymerization, one or more monomer units of the epoxy functional (meth)acrylate monomer of component (c) to a hydroxyl functional (meth)acrylate monomer unit, comprises, reacting one or more monomer units of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 36: A pressure sensitive adhesive composition comprising a polymerization product of a monomer mixture, the monomer mixture comprising the following components:
　　(a) one or more alkyl ester of (meth)acrylic acid or cyclic hydrocarbon acrylate, wherein the one or more alkyl ester of (meth) acrylic acid or cyclic hydrocarbon acrylates comprises at least one low Tg monomer that produces a homopolymer having a Tg of less than −20° C., and wherein the sum of all of the one or more alkyl ester of (meth) acrylic acid or cyclic hydrocarbon is more than 30 wt. %, preferably more than 50 wt. %, most preferably more than 70 wt. %;
　　(b) 0.1 to less than 25 wt. %, preferably 1 to less than 20 wt. %, most preferably 2 to less than 10 wt. % of at least one vinyl ester of $C_4$-$C_{20}$ carboxylic acids;
　　(c) 0.1 to 8 wt. %, preferably 0.5 to 6 wt. %, most preferably 1.0 to 4.0 wt. % of at least one hydroxyl functional (meth)acrylate monomer, or 0.1 to 10 wt. %, preferably 0.5 to 7.0 wt. %, most preferably 1.0 to 4.0 wt. % of at least one epoxy functional (meth)acrylate monomer;
　　(d) 0.05 to 3 wt. %, preferably 0.10 to 2.0 wt. %, most preferably 0.15 to 1.0 wt. % of least one ureido substituted ethylenically unsaturated monomer;
　　(e) 0 to 6 wt. %, preferably 0.5 to 5.0 wt. %, most preferably 1.0 to 3.0 wt. % of at least one ethylenically unsaturated carboxylic acid;
　　(f) 0 to 20 wt. %, preferably 1.0 to 18 wt. %, most preferably 1.5 to 15 wt. % of at least one vinyl aromatic monomer; and
　　(g) 0 to 25 wt. %, preferably 0 to 20 wt. %, most preferably 0 to 15 wt. % of at least one ethylenically unsaturated monomer different from monomers (a) to (f), wherein the wt. % is based on the total weight of the monomer mixture.

Clause 37: The pressure sensitive adhesive composition of clause 36 wherein the one or more alkyl ester of (meth) acrylic acid or cyclic hydrocarbon acrylate further comprises a medium Tg monomer that produces a homopolymer having a Tg of greater than or equal to −20° C. and less than or equal to 50° C.

Clause 38: The pressure sensitive adhesive composition of clause 36 or clause 37 wherein the one or more alkyl ester of (meth)acrylic acid or cyclic hydrocarbon acrylate further comprises a high Tg monomer that produces a homopolymer having a Tg of greater than 50° C.

Clause 39: The pressure sensitive adhesive composition of any one of the clauses 36 through 38 wherein the one or more alkyl ester of (meth)acrylic acid or cyclic hydrocarbon acrylate further comprises a second low Tg monomer.

Clause 40: The pressure sensitive adhesive composition of any one of clauses 36 through 39 wherein the low Tg monomer is selected from the group consisting of 2-propylheptyl acrylate, heptadecyl acrylate, 2-ethylhexyl acrylate, isooctyl acrylate, isodecyl acrylate, dodecyl methacrylate, lauryl methacrylate, butyl acrylate, iso-tridecyl methacrylate, isodecyl methacrylate, and isobutyl acrylate.

Clause 41: The pressure sensitive adhesive composition of any one of clauses 37 through 40 wherein the medium Tg monomer is selected from the group consisting of ethyl acrylate, 2-ethylhexyl methacrylate, benzyl acrylate, lauryl acrylate, methyl acrylate, cyclohexyl acrylate, butyl methacrylate, stearyl methacrylate, stearyl acrylate, t-butyl acrylate, iso-butyl methacrylate.

Clause 42: The pressure sensitive adhesive composition of any one of clauses 38 through 41 wherein the high Tg monomer is selected from the group consisting of sec-butyl methacrylate, ethyl methacrylate, isopropyl methacrylate, isobonyl acrylate, methyl methacrylate, isobornyl methacrylate, phenyl methacrylate, t-butyl methacrylate and cyclohexyl methacrylate.

Clause 43: The pressure sensitive adhesive composition of any one of clauses 36 through 42, wherein the at least one ureido substituted ethylenically unsaturated monomer of component (d) comprises at least two ureido substituted ethylenically unsaturated monomers.

Clause 44: The pressure sensitive adhesive composition of any one of clauses 36 through 43, wherein component (c) comprises the at least one epoxy functional (meth)acrylate monomer (c), and the at least one epoxy functional (meth)acrylate monomer (c) is selected from glycidyl (meth)acrylate, $C_1$-$C_{17}$ hydroxyalkyl (meth)acrylate glycidyl ether, and combinations thereof.

Clause 45: The pressure sensitive adhesive composition of any one of clauses 36 through 44, wherein the one or more one alkyl ester of (meth)acrylic acid or cyclic hydrocarbon acrylates of component (a) comprises a high Tg monomer, and wherein the high Tg monomer is an isobornyl (meth)acrylate.

Clause 46: The pressure sensitive adhesive composition of any one of clauses 36 through 45, wherein component (c) comprises the at least one hydroxyl functional (meth)acrylate monomer (c), and the at least one hydroxyl functional (meth)acrylate monomer (c) is a $C_1$-$C_{17}$ hydroxy alkyl (meth)acrylate.

Clause 47: The pressure sensitive adhesive composition of any one of clauses 36 through 46, wherein the at least one hydroxyl functional (meth)acrylate monomer (c) is selected from hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxyhexyl methacrylate, hydroxyethylhexyl acrylate, hydroxyethylhexyl methacrylate, and combinations thereof.

Clause 48: The pressure sensitive adhesive composition of any one of clauses 36 through 47, wherein the at least one ureido substituted ethylenically unsaturated monomer component (d) is selected from ureido substituted (meth)acrylate monomers, ureido substituted allyl monomers, and combinations thereof.

Clause 49: The pressure sensitive adhesive composition of any one of clauses 36 through 48, wherein the at least one ureido substituted ethylenically unsaturated monomer component (d) is a $C_7$-$C_{17}$ ureido alkyl acrylate or a $C_7$-$C_{17}$ ureido alkyl methacrylate.

Clause 50: The pressure sensitive adhesive composition of any one of clauses 36 through 49, wherein the at least one ureido substituted ethylenically unsaturated monomer component (d) comprises at least one or more oxygen, nitrogen, silicon atom in a spacer unit; wherein the at least one ureido substituted ethylenically unsaturated monomer has a ureido functionality and a ethylenic functionality, and wherein the spacer unit separates the ureido functionality from the ethylenic functionality.

Clause 51: The pressure sensitive adhesive composition of any one of clauses 36 through 50, wherein the at least one vinyl ester of $C_4$-$C_{20}$ carboxylic acids of component (b) comprises a vinyl ester of a $C_8$-$C_{12}$ carboxylic acid.

Clause 52: The pressure sensitive adhesive composition of any one of clauses 36 through 61, wherein the vinyl ester of a $C_8$-$C_{12}$ carboxylic acid is a vinyl ester of a branched $C_8$-$C_{10}$ carboxylic acid.

Clause 53: The pressure sensitive adhesive composition of any one of clauses 36 through 52, wherein: The pressure sensitive adhesive composition of clause 18, wherein the vinyl ester of a branched $C_8$-$C_{10}$ carboxylic acid contains a quaternary carbon.

Clause 54: The pressure sensitive adhesive composition of any one of clauses 36 through 53, wherein the quaternary carbon of the vinyl ester of the branched $C_8$-$C_{10}$ carboxylic acid quaternary carbon is bonded to an isobutyl group, a methyl group, a propyl group, and a carboxylic ester group.

Clause 55: The pressure sensitive adhesive composition of any one of clauses 36 through 54, wherein the at least one vinyl aromatic monomer (f) is selected from styrene, methylstyrene, tert-butylstyrene, dimethylstyrene, ethylstyrene, diisopropylstyrene, dimethylstyrene, butyl-methylstyrene, chlorostyrene, bromostyrene methyl-dichlorostyrene, dibromostyrene, vinylnaphthalene, vinyltoluene, vinylxylene, vinylpyridine, diphenylethylenes, substituted diphenylethylenes, and mixtures thereof.

Clause 56: The pressure sensitive adhesive composition of any one of clauses 36 through 55, wherein the at least one ethylenically unsaturated monomer component (g) is selected from vinyl esters of $C_1$-$C_3$ carboxylic acid monomers, nitriles of ethylenically unsaturated carboxylic acids, ethylenically unsaturated surfactants, and combinations thereof.

Clause 57: The pressure sensitive adhesive composition of any one of clauses 36 through 56, wherein further comprising tackifiers or polyolefin emulsions or combinations thereof.

Clause 58: The pressure sensitive adhesive composition of clause 57, wherein the tackifiers or polyolefin emulsion comprise a carboxylated polyethylene copolymer.

Clause 59: The pressure sensitive adhesive composition of any one of clauses 36 through 58, wherein the pressure sensitive composition has a peel adhesion strength over a 15 minute dwell time to Stainless Steel, Poly Propylene and Polystyrene is over 3.0 lbs/inch according to method A of PSTC-101.

Clause 60: The pressure sensitive adhesive composition of any one of clauses 36 through 59, wherein the pressure sensitive composition has a peel adhesion strength over a 15 minute dwell time to HDPE is over 1.4 lbs/inch, a peel adhesion strength to Stainless Steel of over 3.2 lbs/inch, and a peel adhesion strength to Polystyrene is over 3.3 lbs/inch according to method A of PSTC-101.

Clause 61: A process for making the polymerization product of the monomer mixture of any one of clauses 36 through 60, comprising,
- polymerizing, by a polymerization step, the monomer mixture,
- monitoring temperature, during the polymerization step, and
- recording a maximum temperature during the polymerization step,
- wherein the maximum temperature recorded during the monitoring is that of a reaction exotherm peak, and
- wherein the entire amount of the at least one ureido substituted ethylenically unsaturated monomer (d) is added to components (a)-(c) and (e)-(g) after the maximum temperature is reached.

Clause 62: A post-processing step performed on a redispersed polymer, dried polymer or polymer latex (collectively, the "polymer") resulting from polymerizing, by polymerization, the monomer mixture of any one of clauses 36 through 60, wherein the post-processing step comprises,
- treating the polymer with glycidyl alkyl compounds or diol compounds to at least partially convert structural units resulting from polymerization of the at least one ethylenically unsaturated carboxylic acid (e) into structural units which can result from polymerization of the at least one hydroxyl functional (meth)acrylate monomer (c).

Clause 63: The pressure sensitive adhesive composition of any one of clauses 36 through 60, wherein the composition does not contain (is free of) components having oxirane functionality.

Clause 64: An article comprising the pressure sensitive adhesive composition of any one of clauses 36 through 60, wherein the pressure sensitive adhesive composition is freely applied to the article or is applied as an adhesive tape containing a first surface, and wherein the article is an automotive; marine vessel; electronic component; furnace; pyrolysis unit; exhaust gas equipment; subterranean piping; subterranean construction enabling the conveyance of crude oil/gas; industrial hot utility equipment; reactor vessel containing reactants for performing an exothermic reaction; rotating machinery such as centrifuges, space equipment, geothermal apparatus, or medical implants; or any other suitable article.

Clause 65: The article of clause 64, wherein the pressure sensitive adhesive composition is applied as an adhesive tape containing a first surface, and wherein the adhesive tape is further mounted on to a second surface wherein the second surface comprises a surface to which the pressure sensitive adhesive does not strongly adhere, wherein the second surface is made of a silicone based material.

Clause 66: A method of forming the polymerization product of the monomer mixture of any one of clauses 36 through 60, comprising:
- converting at least a portion of the epoxy functional (meth)acrylate monomer of component (c) to a hydroxyl functional (meth)acrylate monomer, before polymerization; and/or
- converting at least a portion of the epoxy functional (meth)acrylate monomer of component (c) to a hydroxyl functional (meth)acrylate monomer, during polymerization; and/or
- converting one or more monomer units of the epoxy functional (meth)acrylate monomer of component (c) to a hydroxyl functional (meth)acrylate monomer unit, after completion of the polymerization.

Clause 67: The method of clause 66, wherein:
- converting, before polymerization, at least a portion of the epoxy functional (meth)acrylate monomer of component (c) to a hydroxyl functional (meth)acrylate monomer, comprises, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 68: The method of clauses 66 or 67, wherein:
- converting, during polymerization, at least a portion of the epoxy functional (meth)acrylate monomer of component (c) to a hydroxyl functional (meth)acrylate monomer, comprises, reacting at least a portion of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 69: The method of clauses 66, 67 or 68, wherein:
- converting, after completion of the polymerization, one or more monomer units of the epoxy functional (meth)acrylate monomer of component (c) to a hydroxyl functional (meth)acrylate monomer unit, comprises, reacting one or more monomer units of the epoxy functional (meth)acrylate monomer of component (c) with an active hydrogen functional material, such as, but not limited to: an alcohol, such as a mono-functional alcohol; and/or an acid, such as a mono-functional carboxylic acid.

Clause 70: A process for making the polymerization product of the monomer mixture of any one of clauses 1 through 24, comprising,
- polymerizing, by a polymerization step, the monomer mixture,
- monitoring temperature, during the polymerization step, and
- recording a maximum temperature during the polymerization step,
- wherein the maximum temperature recorded during the monitoring is that of a reaction exotherm peak, and
- wherein at least a portion of the at least one ureido substituted ethylenically unsaturated monomer (d) is added to components (a)-(c) and (e)-(g) before the maximum temperature is reached.

Clause 71: A process for making the polymerization product of the monomer mixture of any one of clauses 1 through 24, comprising,
- polymerizing, by a polymerization step, the monomer mixture,
- monitoring temperature, during the polymerization step, and
- recording a maximum temperature during the polymerization step,
- wherein the maximum temperature recorded during the monitoring is that of a reaction exotherm peak, and
- wherein at least a portion of the at least one ureido substituted ethylenically unsaturated monomer (d) is added to components (a)-(c) and (e)-(g) when the maximum temperature is reached.

The present invention has been described with reference to specific details of particular embodiments thereof. It is not intended that such details be regarded as limitations upon the scope of the invention except insofar as to the extent that they are included in the accompanying claims.

What is claimed is:

1. A pressure sensitive adhesive composition comprising a polymerization product of a monomer mixture, the monomer mixture comprising the following components:
   (a) one or more alkyl ester of (meth)acrylic acid or cyclic hydrocarbon acrylate, wherein the one or more alkyl ester of (meth)acrylic acid or cyclic hydrocarbon acrylate comprises at least one low Tg monomer that produces a homopolymer having a Tg of less than −20° C., and wherein the sum of all of the one or more alkyl ester of (meth)acrylic acid or cyclic hydrocarbon acrylate is more than 30 wt. %;
   (b) 0.1 to less than 25 wt. % of a vinyl ester of versatic acid;
   (c) 0.1 to 8 wt. % of at least one hydroxyl functional (meth)acrylate monomer, or 0.1 to 10 wt. % of at least one epoxy functional (meth)acrylate monomer;
   (d) 0.05 to 3 wt. % of least one ureido substituted ethylenically unsaturated monomer;
   (e) optionally 0 to 6 wt. % at least one ethylenically unsaturated carboxylic acid; [[and]]
   (f) optionally 0 to 20 wt. % of at least one vinyl aromatic monomer; and
   (g) optionally 0 to 25 wt. % of at least one ethylenically unsaturated monomer different from monomers (a) to (f),
   wherein the wt. % is based on the total weight of the monomer mixture.

2. The pressure sensitive adhesive composition of claim 1, wherein component (a) further comprises at least one medium Tg monomer that produces a homopolymer having a Tg of greater than or equal to −20° C. and less than or equal to 50° C.

3. The pressure sensitive adhesive composition of claim 1, wherein component (a) further comprises at least one high Tg monomer that produces a homopolymer having a Tg greater than 50° C.

4. The pressure sensitive adhesive composition of claim 1, wherein component (a) further comprises a second low Tg monomer.

5. The pressure sensitive adhesive composition of claim 1, wherein the sum of all of the one or more alkyl ester of (meth)acrylic acid or cyclic hydrocarbon acrylate is between 70 to 92% by weight of monomers (a) to (g).

6. The pressure sensitive adhesive composition of claim 1, wherein the at least one ureido substituted ethylenically unsaturated monomer of component (d) comprises at least two ureido substituted ethylenically unsaturated monomers.

7. The pressure sensitive adhesive composition of claim 1, wherein the one or more alkyl ester of (meth)acrylic acid or cyclic hydrocarbon acrylate of component (a) is a $C_1$-$C_{18}$ alkyl (meth)acrylate.

8. The pressure sensitive adhesive composition of claim 1, wherein component (c) comprises the at least one hydroxyl functional (meth)acrylate monomer (c), and the at least one hydroxyl functional (meth)acrylate monomer (c) is a $C_1$-$C_{17}$ hydroxy alkyl (meth)acrylate.

9. The pressure sensitive adhesive composition of claim 1, wherein component (c) comprises the at least one epoxy functional (meth)acrylate monomer (c), and the at least one epoxy functional (meth)acrylate monomer (c) is selected from glycidyl (meth)acrylate, $C_1$-$C_{17}$ hydroxyalkyl (meth)acrylate glycidyl ether, and combinations thereof.

10. The pressure sensitive adhesive composition of claim 1, wherein the at least one hydroxyl functional (meth)acrylate monomer (c) is selected from hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxyhexyl methacrylate, hydroxyethylhexyl acrylate, hydroxyethylhexyl methacrylate, and combinations thereof.

11. The pressure sensitive adhesive composition of claim 1, wherein the at least one ureido substituted ethylenically unsaturated monomer component (d) is selected from ureido substituted (meth)acrylate monomers, ureido substituted allyl monomers, and combinations thereof.

12. The pressure sensitive adhesive composition of claim 1, wherein the at least one vinyl aromatic monomer (f) is selected from the group consisting of styrene, methylstyrene, tert-butylstyrene, dimethyl styrene, ethylstyrene, diisopropylstyrene, dimethylstyrene, butyl-methylstyrene, chlorostyrene, bromostyrene methyl-dichlorostyrene, dibromostyrene, vinylnaphthalene, vinyltoluene, vinylxylene, vinylpyridine, diphenylethylenes, substituted diphenylethylenes, and mixtures thereof.

13. The pressure sensitive adhesive composition of claim 1, further comprising tackifiers or polyolefin emulsions or combinations thereof.

14. The pressure sensitive adhesive composition of claim 1, wherein the at least one ethylenically unsaturated monomer component (g) is selected from the group consisting of vinyl esters of C1-C3 carboxylic acid monomers, nitriles of ethylenically unsaturated carboxylic acids, ethylenically unsaturated surfactants, and combinations thereof.

15. A method for making a polymerization product comprising
   reacting a monomer mixture comprising the following components:
   (a) one or more alkyl ester of (meth)acrylic acid or cyclic hydrocarbon acrylate, wherein the one or more alkyl ester of (meth)acrylic acid or cyclic hydrocarbon acrylate comprises at least one low Tg monomer that produces a homopolymer having a Tg of less than −20° C., and wherein the sum of all of the one or more alkyl ester of (meth)acrylic acid or cyclic hydrocarbon acrylate is more than 30 wt. %;
   (b) 0.1 to less than 25 wt. % of a vinyl ester of versatic acid;
   (c) 0.1 to 8 wt. % of at least one hydroxyl functional (meth)acrylate monomer, or 0.1 to 10 wt. % of at least one epoxy functional (meth)acrylate monomer;
   (d) 0.05 to 3 wt. % of least one ureido substituted ethylenically unsaturated monomer;
   (e) optionally 0 to 6 wt. % at least one ethylenically unsaturated carboxylic acid;
   (f) optionally 0 to 20 wt. % of at least one vinyl aromatic monomer; and
   (g) optionally 0 to 25 wt. % of at least one ethylenically unsaturated monomer different from monomers (a) to (f),
   wherein the wt. % is based on the total weight of the monomer mixture.

16. The method according to claim 15, further comprising subjecting the product to treatment with glycidyl alkyl compounds or diol compounds to at least partially convert structural units resulting from polymerization of the at least one ethylenically unsaturated carboxylic acid (e) into structural units which can result from polymerization of the at least one hydroxy] functional (meth)acrylate monomer (c).

17. The method according to claim 15, wherein component (a) further comprises at least one medium Tg monomer that produces a homopolymer having a Tg of greater than or equal to −20° C. and less than or equal to 50° C.

18. The method according to claim 15, wherein component (a) further comprises at least one high Tg monomer that produces a homopolymer having a Tg greater than 50° C.

19. An article made by a process comprising reacting a monomer mixture comprising the following components:

(a) one or more alkyl ester of (meth)acrylic acid or cyclic hydrocarbon acrylates, wherein the one or more alkyl ester of (meth)acrylic acid or cyclic hydrocarbon acrylate comprises at least one low Tg monomer that produces a homopolymer having a Tg of less than −20° C., and wherein the sum of all of the one or more alkyl ester of (meth)acrylic acid or cyclic hydrocarbon acrylate is more than 30 wt. %;

(b) 0.1 to less than 25 wt. % of a vinyl ester of versatic acid;

(c) 0.1 to 8 wt. % of at least one hydroxyl functional (meth)acrylate monomer, or 0.1 to 10 wt. % of at least one epoxy functional (meth)acrylate monomer;

(d) 0.05 to 3 wt. % of least one ureido substituted ethylenically unsaturated monomer;

(e) optionally 0 to 6 wt. % at least one ethylenically unsaturated carboxylic acid; [[and]]

(f) optionally 0 to 20 wt. % of at least one vinyl aromatic monomer; and (g) optionally 0 to 25 wt. % of at least one ethylenically unsaturated monomer different from monomers (a) to (f), wherein the wt. % is based on the total weight of the monomer.

* * * * *

UNITED STATES PATENT AND TRADEMARK OFFICE
CERTIFICATE OF CORRECTION

PATENT NO. : 11,306,169 B2
APPLICATION NO. : 16/057194
DATED : April 19, 2022
INVENTOR(S) : Jong S. Guo et al.

It is certified that error appears in the above-identified patent and that said Letters Patent is hereby corrected as shown below:

In the Claims

Column 37, Line 24, Claim 1, delete "of least" and insert -- of at least --

Column 37, Line 26, Claim 1, delete "%" and insert -- % of at --

Column 37, Line 27, Claim 1, after "acid;" delete "[[and]]"

Column 38, Line 20, Claim 12, delete "dimethyl styrene," and insert -- dimethylstyrene, --

Column 38, Line 22, Claim 12, delete "bromostyrene" and insert -- bromostyrene, --

Column 38, Line 32, Claim 14, delete "C1-C3" and insert -- $C_1$-$C_3$ --

Column 38, Line 52, Claim 15, delete "of least" and insert -- of at least --

Column 38, Line 54, Claim 15, delete "% at" and insert -- % of at --

Column 39, Line 2, Claim 16, delete "hydroxy]" and insert -- hydroxyl --

Column 40, Line 8, Claim 19, delete "of least" and insert -- of at least --

Column 40, Line 10, Claim 19, delete "%" and insert -- % of at --

Column 40, Line 11, Claim 19, after "acid;" delete "[[and]]"

Signed and Sealed this
Twenty-fifth Day of October, 2022

*Katherine Kelly Vidal*

Katherine Kelly Vidal
*Director of the United States Patent and Trademark Office*